United States Patent [19]

Full et al.

[11] 4,301,678

[45] Nov. 24, 1981

[54] RELATIVE POWER CONTRIBUTION OF AN INTERNAL COMBUSTION ENGINE

[75] Inventors: Gary G. Full, Ellington; Rinaldo R. Tedeschi, Newington, both of Conn.

[73] Assignee: United Technologies Corporation, Hartford, Conn.

[21] Appl. No.: 105,447

[22] Filed: Dec. 20, 1979

[51] Int. Cl.³ .......................................... G01M 15/00
[52] U.S. Cl. .................................................. 73/116
[58] Field of Search ............... 73/116, 117.3; 364/431, 364/551

[56] References Cited

U.S. PATENT DOCUMENTS 4,064,747 12/1977 Rackliffe et al. ..................... 73/116

Primary Examiner—Jerry W. Myracle
Attorney, Agent, or Firm—Dominic J. Chiantera

[57] ABSTRACT

The relative power contribution of each cylinder in an internal combustion (IC) engine which is connected through a common drive shaft to an engine load and which is running at a selected speed, is provided as the relative magnitudes of each cylinder's contribution to the fluctuations in a sub-cyclic net torque signal provided as the difference torque value between an instantaneous sub-cyclic engine torque signal and an instantaneous sub-cyclic load torque signal.

5 Claims, 11 Drawing Figures

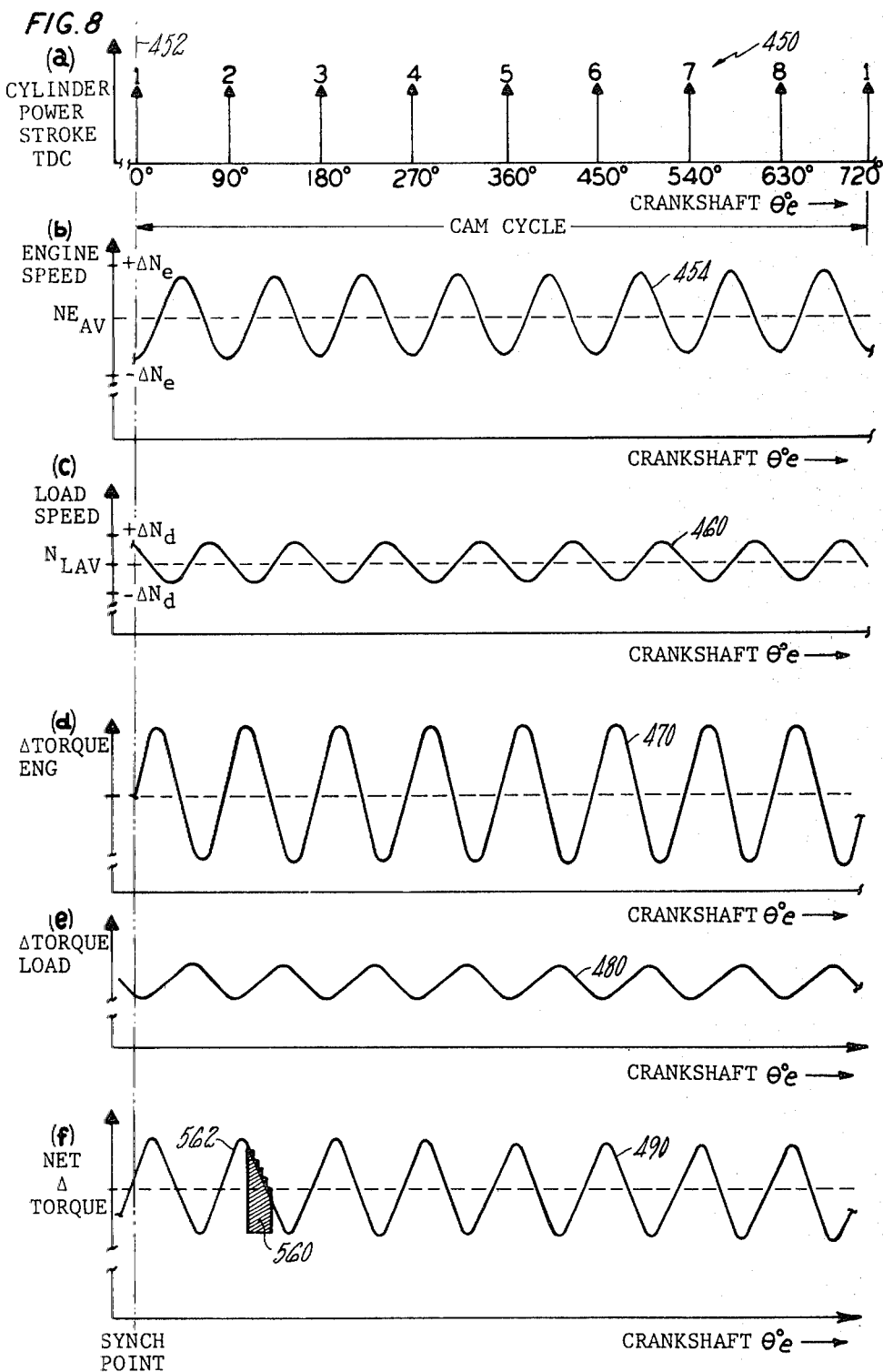

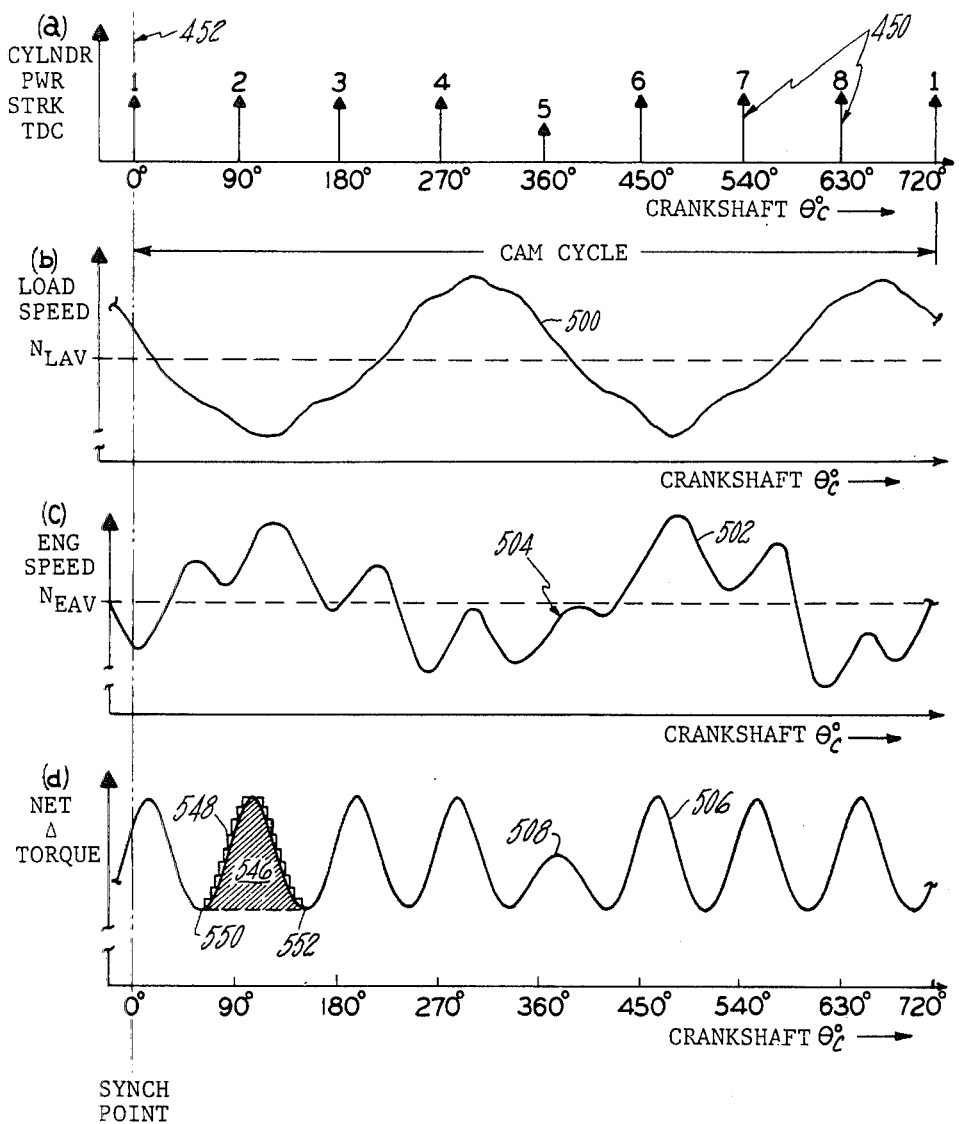

RELATIVE POWER CONTRIBUTION OF AN INTERNAL COMBUSTION ENGINE

DESCRIPTION

1. Technical Field

This invention relates to the extra-vehicular hot-testing of internal combustion (IC) engines, and more particularly to diagnosing hot-test engine performance electronically.

2. Background Art

Hot-testing of IC engins outside of a vehicle (extra-vehicular) is known generally, being used mainly in the testing of newly manufactured, production line engines and in the testing of overhauled or repaired engines. The term hot-test refers to testing the engine with ignition to determine basic dynamic engine performance. At present, the actual tests performed during the engine hot-test involve the most basic test criteria and rely almost entirely on the hot-test operator for diagnosing base-line engine performance. Although the tests may involve measurement of basic engine timing, in general the pass/fail acceptance standards are based on what the operator perceives of the engine running characteristics, such as the inability to start or to maintain engine speed, or the sound of the engine while running. These tests do provide suitable pass/fail criteria for gross engine malfunctions, however, it is impossible, except to the most experienced operator, to provide even simple diagnosis of the cause of the engine poor performance.

In the first instance, the inability to provide quantitative measurements of engine performance and acceptance, results in the acceptance of marginal engines in which the actual failure occurs sometime later as an infant mortality, perhaps after installation in the vehicle. Conversely, the rejection of an engine based on the present qualitative standards may be unwarranted in many instances, resulting in the unnecessary recycling of the engine through some type of repair facility, where with more extensive testing the apparent fault may be corrected with a minor engine adjustment. Therefore, it is desirable to establish an accurate quantitative analysis testing procedure which with measurement of selected engine parameters may provide for accurate pass/fail determination.

In the present stae of the art of IC engine diagnostics electronoic analysis has provided superior, quantitative test standards for measuring engine performance. These test diagnostics, however, are intended for testing vehicle mounted engines under test conditions which are of necessity less controlled than those potentially available in the hot-testing of engines. One such known test which provides a general indication of overall engine health is the measurement of relative cylinder power contribution for vehicle installed engines as described in U.S. Pat. No. 4,064,747 to Rackliffe et al, entitled RELATIVE AND SUB-CYCLIC SPEED MEASUREMENTS FOR INTERNAL COMBUSTION ENGINE DIAGNOSTICS and owned by common assignee herewith. This test includes the snap acceleration of the engine loaded only by the rotational inertia of the engine accessory loads with sensed engine speed data being taken along the acceleration profile. The individual sub-cyclic fluctuations in speed associated with each cylinder are then measured and compared as an indication of relative power contribution.

The limitation on the snap acceleration method is the requirement that the sub-cyclic speed fluctuations must be measured on the fly, before full speed is achieved. This limitation is minimized to some extent by the accessory loading which requires a number of engine revolutions before full speed is achieved. The use of the snap acceleration method for hot-testing engines outside of a vehicle where there is no accessory loading other than the engine flywheel is both impractical and potentially dangerous. The absence of load other than the flywheel results in: (1) insufficient sub-cyclic speed resolution, (2) rapid acceleration to maximum speed within a few revolutions which limits the time available to measure the sub-cyclic speed, and (3) the danger of exceeding maximum engine speed causing destruction of the engine. Although these problems may be less apparent in diesel engines which have a heavy flywheel and, therefore, a large rotational inertia which results in adequate loading of the engine to provide sufficient resolution from which engine speed data may be obtained, and with the slow acceleration characteristics of diesel engines a sufficient number of engine revolutions of data are available before the governor controlled maximum speed limit is achieved. On the other hand, spark ignition IC engines generally have comparatively lightweight flywheels which (1) do not provide sufficient crankshaft loading to permit any reasonably accurate measure of acceleration, (2) achieve full speed in only one or two revolutions of the crankshaft which does not allow sufficient crankshaft data for accurate change in speed measurements, and (3) are not governor controlled such that engine fly-away is a definite potential hazard.

Although the hot-test engine may be loaded in a test stand with a selectable torque load, such as a dynamometer, thereby overcoming the deficiencies in load, data acquisition, and the potential fly-away problem, the load's rotational inertia contributes to the apparent engine torque while the engine is operating. This is due to the "stored energy" in the load provided by its intertia which: (1) provides a drag to the engine crankshaft under change in engine speed, and (2) contributes to maintaining shaft speed at the steady state value achieved prior to engine de-acceleration. This problem is even more manifest when the desired engine torque data is that occurring at sub-cyclic speeds, since the sub-cyclic speed fluctuations caused by the individual cylinder firing are significantly affected by the load torque contribution. This prevents the accurate measurement of torque and limits the reliability of the apparent torque measurements for use in diagnosing engine sub-cyclic performance.

CROSS-REFERENCE TO RELATED APPLICATIONS

Some of the subject matter disclosed and claimed herein is also disclosed in one or more of the following commonly owned, copending U.S. patent applications filed on even date herewith by: Full et al, Ser. No. 105,803, entitled RELATIVE MANIFOLD VACUUM OF AN INTERNAL COMBUSTION ENGINE; Full et al, Ser. No. 105,446, entitled RELATIVE EXHAUST BACK-PRESSURE OF AN INTERNAL COMBUSTION ENGINE; Tedeschi et al, Ser. No. 105,448, entitled SNAP ACCELERATION TEST FOR AN INTERNAL COMBUSTION ENGINE: and Full et al, Ser. No. 105,680 entitled SPARK PLUG LOAD TESTING FOR AN INTERNAL COMBUSTION ENGINE.

DISCLOSURE OF INVENTION

One object of the present invention is to provide quantitative measurement of the sub-cyclic relative power balance between cylinders of an IC engine under extra-vehicular, hot-test conditions without loss of accuracy due to load imposed data distortion.

According to the present invention the individual cylinder contributions to the fluctuations, or delta values, of the net sub-cyclic torque of the loaded engine, provided as the difference between the delta sub-cyclic torque values of the engine and load over at least one engine cam cycle, are measured within the individual cylinder sub-cycle portions of the net delta torque data waveform; each cylinder contribution being compared with each other cylinder's contribution to provide individual cylinder indices of the relative power balance of the engine. In further accord with the present invention, the delta sub-cyclic torque values of the engine and load are determined by sensing delta sub-cyclic speed values for each at selected crankshaft angles over one or more engine cycles, the sub-cyclic speed values obtained are differentiated with respect to crankshaft angle and multiplied by the total instantaneous speed value sensed at the particular crankshaft position to provide an indication of angular acceleration, the resultant acceleration indications for each are multiplied by the association rotational inertia values of the engine and load to provide the delta sub-cyclic torque indications for both engine and load over one engine cycle. In still further accord with the present invention the individual cylinder contribution to the net delta sub-cyclic torque is measured by integrating the instantaneous net delta torque values provided by each cylinder over the crankshaft angle interval associated with each cylinder, each cylinder net delta torque integral summation being compared with each of the other cylinders to provide an indication of relative power contribution. In still further accord with the present invention, each cylinder's contribution to the net delta torque is measured by the integration of the instantaneous values of net torque associated with each cylinder over a crankshaft sub-angle interval less than that associated with the full cylinder portion, the selected crankshaft sub-angle interval being equal for each cylinder, the actual crankshaft angle values providing the sub-angle for each cylinder being selected in dependence on the particular model type IC engine tested.

The relative power contribution test of the present invention provides for the determination of overall engine performance by analyzing the sub-cyclic fluctuations in net engine torque at prescribed crankshaft angle intervals associated with each cylinder, thereby providing an accurate measure of the engine relative power balance at steady state engine speeds. These and other objects, features and advantages of the present invention will become more apparent in light of the detailed description of a best mode embodiment thereof, as illustrated in the accompanying drawing.

BRIEF DESCRIPTION OF DRAWING

FIG. 8 is an illustration of a set of waveforms characterizing one aspect of the dynamic performance of an engine under load which is used in the description of the present invention;

FIG. 9 is an illustration of another set of waveforms characterizing another aspect of the dynamic performance of an engine under load which is sued in the description of the present invention.

BEST MODE FOR CARRYING OUT THE INVENTION

Figure 1:
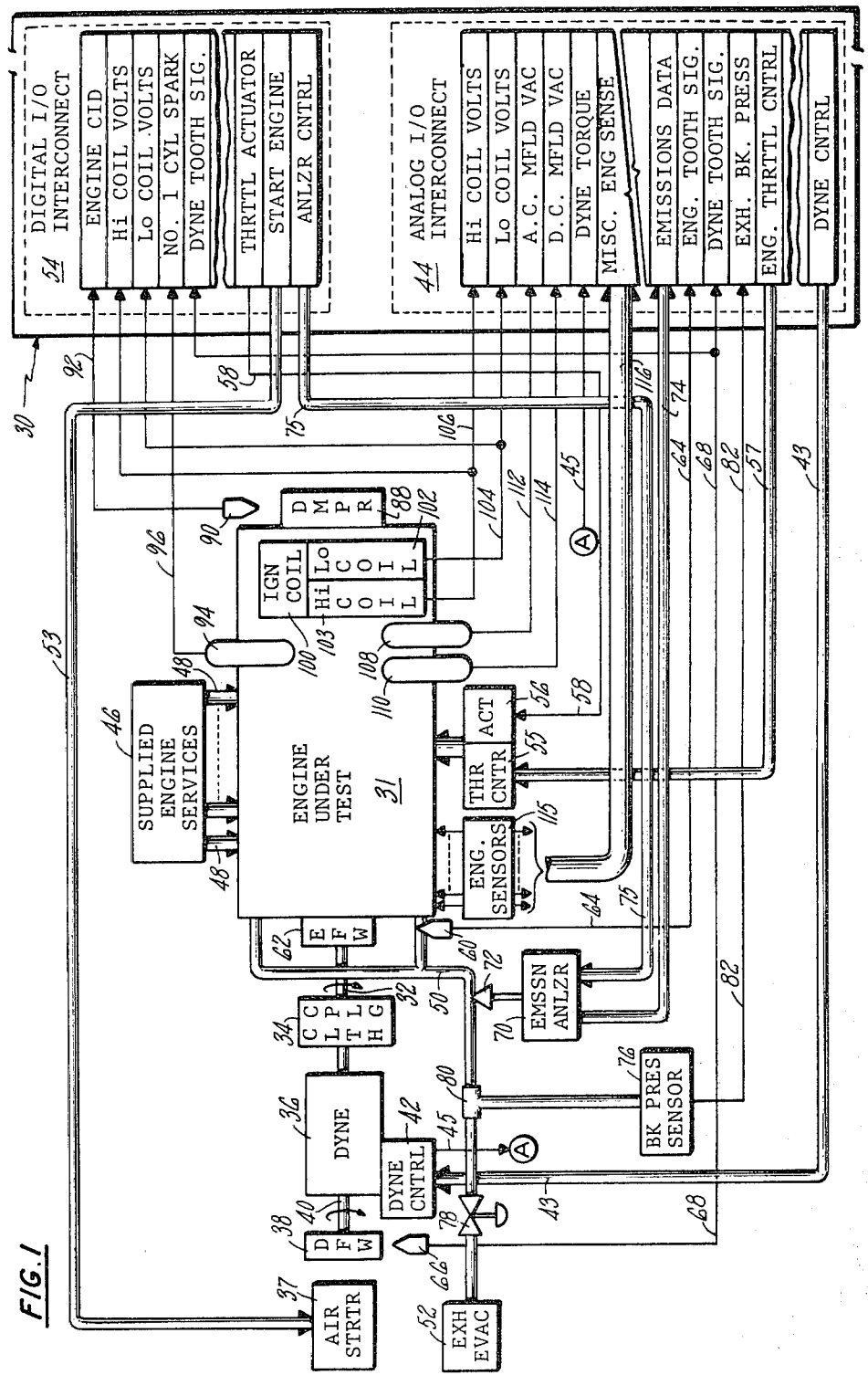
FIG. 1 is a schematic block diagram illustration of the instrumentation in a typical engine hot-test installation in which the present invention may be used.

Referring to FIG. 1, in a simplified illustration of an engine hot-test installation in which the present invention may be used, a test control system 30 receives sensed engine data from the test engine 31 which is mounted in a test stand (not shown) and loaded by connection of the engine crankshaft 32 through a coupling assembly 34 to an engine load, such as a brake mechanism or, as illustrated, a dynamometer (dyne) load 36. The dyne is known type, such as the Go-Power Systems model D357 water dynamometer, equipped with an air starter 37. The air starter is used to crank the test engine (through the dyne) in the absence of an engine mounted starter. A dyne flywheel 38, connected to the dyne shaft 40, includes a ring-gear (not shown) having a selected number of precision machined gear teeth equally spaced around the circumference of the ring-gear so that the tooth-to-tooth intervals define substantially equal increments of dyne shaft angle. Dyne control circuitry 42 controls the dyne load torque (Ft-Lb) to a set point torque reference signal provided on lines 43 from the analog interconnect 44 of the control system 30, by controlling the amount of water in the dyne drum (not illustrated in FIG. 1). The dyne control circuitry also provides a sensed, actual dyne torque signal on a line 45 to the analog interconnect of the control system.

The test engine is provided with the engine services 46 necessary for engine operation, such as fuel, oil, and water, etc. through service connections 48. The engine exhaust manifolds are connected through exhaust line 50 to an exhaust evacuating pump 52. Following engine start-up in response to a "start engine" discrete signal presented on lines 53 to the starter 37 (or engine starter if available) from the control system digital interconnect 54, an engine throttle control 55 and associated throttle control actuator 56 control the engine speed (RPM) to an engine RPM reference set point signal provided to the control on lines 57 from the analog interconnect. In addition, the actuator receives a discrete signal from the digital interconnect 54 on a line 58, which is used to provide snap acceleration of the engine as described hereinafter. In summary, the test engine under hot-test is operated under controlled load at selected engine speed profiles to permit the dynamic analysis of the engine base-line parameters and the engine diagnostic routines described hereinafter.

The hot-test sequence examines engine base-line parameters related to speed, exhaust emissions, ignition cycle timing, and spark duration to determine engine health, i.e., output power and combustion efficiency. The speed measurements include engine crankshaft speed (RPM) and dyne shaft speed. The indication of engine crankshaft speed may be provided by any type of rotational speed sensing device, such as a shaft encoder, or preferably a magnetic pick-up sensor 60, such as Electro Corp. RGT model 3010-AN Magnetic Proximity Sensor, which senses the passage of the teeth of the engine ring-gear mounted on the engine flywheel 62 and provides an engine series tooth pulse signal on the line 64 to the analog interconnect. The actual number of ring-gear teeth depends on the particular engine model with 128 teeth being average. The teeth are uniformly spaced around the circumference of the ring gear, such that 128 teeth provide tooth-to-tooth spacing corresponding to a crankshaft angle interval of 2.813 degrees. This is adequate for marking subcyclic cylinder events within the ignition cycle, but due to the variation of total tooth count with different engine models it may be preferred to provide the crankshaft angle resolution required by the control system from the load speed indication. The load speed may also be sensed with a shaft encoder or by sensing the teeth of the dyne ring-gear which has a tooth count typically twice that of the engine ring-gear, or 256 teeth for the 128-tooth engine ring-gear. This is provided by a proximity sensor 66, similar to the sensor 60, which senses the passage of the dyne ring-gear teeth to provide a dyne series tooth pulse signal on line 68 to the analog interconnect. The precision edging of the dyne teeth allows for exact resolution on the leading and trailing edges of each of the tooth pulse signals which permits (as described in detail hereinafter) edge detection of each to provide an equivalent 512 dyne tooth intervals per crankshaft revolution.

Engine exhaust measurements include both exhaust gas analysis and exhaust back-pressure measurements. The emissions analysis measures the hydrocarbon (HC) and carbon monoxide (CO) constitutes of the exhaust with an emission analyzer 70, of a type known in the art such as the Beckman model 864 infrared analyzer. The analyzer is connected to the exhaust pipe 50 through an emissions probe 72. The HC and CO concentration is determined by the differential measurement of the absorption of infrared energy in the exhaust gas sample. Specifically, within the analyzer two equal energy infrared beams are directed through two optical calls; a flow through exhaust gas sample cell and a sealed reference cell. The analyzer measures the difference between the amounts of infrared energy absorbed in the two cells and provides, through lines 74 to the control system analog interconnect, HC and CO concentrations as DC signals with full scale corresponding typically to: (1) a full-scale HC reading of 1000 PPM, and (2) a full-scale CO of 10%. The analyzer operating modes are controlled by control signal discretes provided on lines 75 from the digital interconnect. The exhaust back-pressure instrumentation includes a back-pressure sensor 76, such as a Viatran model 21815 with a range of $\pm 5$ PSIG, and a back-pressure valve 78, such as a Pacific Valve Co. model 8-8552. The pressure sensor is connected to the exhaust line 50 with a tap joint 80 and provides a signal indicative of exhaust back-pressure on line 82 to the analog interconnect. The back-pressure valve simulates the exhaust system load normally provided by the engine muffler and is typically a manually adjustable 2" gate valve with a range of 15 turns between full open and full closed.

The engine ignition timing information is derived from the crankshaft angle information provided by the dyne and engine ring-gear teeth and by sensing a crankshaft index (CI), such as the timing marker on the engine damper 88. The CI is sensed with a magnetic pick-up sensor 90, such as the Electro Corp. Model 4947 proximity switch, which preferably is mounted through a hole provided on the damper housing and measures the passage of the timing marker notch on the damper. The sensor mounting hole is at a known crankshaft angle value from the top dead center (TDC) position of the #1 cylinder, and is determined from the engine specifications. The notch triggers a signal pulse by passing near the CI sensor every crankshaft revolution and the CI pulses are provided on lines 92 to the control system digital interconnect. In addition, the ignition cycle information includes measurement of the #1 cylinder sparkplug firing which in combination with the CI sensor indication provides a crankshaft synchronization point corresponding to the TDC of the #1 cylinder power stroke. The spark firing is sensed by a clamp-on Hall effect sensor 94 which provides a voltage signal pulse coincident with the sparkplug firing on a line 96 to the digital interconnect.

The sparkplug signal duration measurements are provided by measuring the primary (Lo Coil) and secondary (Hi Coil) voltage signals of the engine ignition coil 100. The Lo Coil voltage is sensed by a connection 102 to the primary of the coil and the Hi Coil voltage is measured with a sensor 103, such as a Tektronix Model P6015 high-voltage probe with a range of 0 to 50 KV. The signals are provided on lines 104, 106 to both interconnects of the control system.

In addition to sensing engine speed, exhaust, ignition timing and spark duration parameters, the intake manifold vacuum pressure is also sensed. Two vacuum measurements are made; a DC manifold vacuum which provides the average vacuum level, and an AC manifold vacuum which provides instantaneous values of vacuum. The AC measurements are made by inserting a pressure sensor 108, such as a VIATRAN Model 218 with a range of $\pm 1$ PSIG, in the engine vacuum line connected to the PCV valve. The DC manifold vacuum sensor 110 may be a VIATRAN Model 218 with a range of $\pm 15$ PSIG inserted in the same vacuum line. Each sensor provides a voltage signal indicative of the sensed pressure on lines 112, 114 to the control system. Additional engine sensors 115, such as pressure and temperature of the engine oil, fuel, water, etc. are provided to the control system through lines 116. The sensors provide the information on the necessary prerequisite engine ambient conditions which must be established prior to test, as discussed in detail hereinafter.

Figure 2:
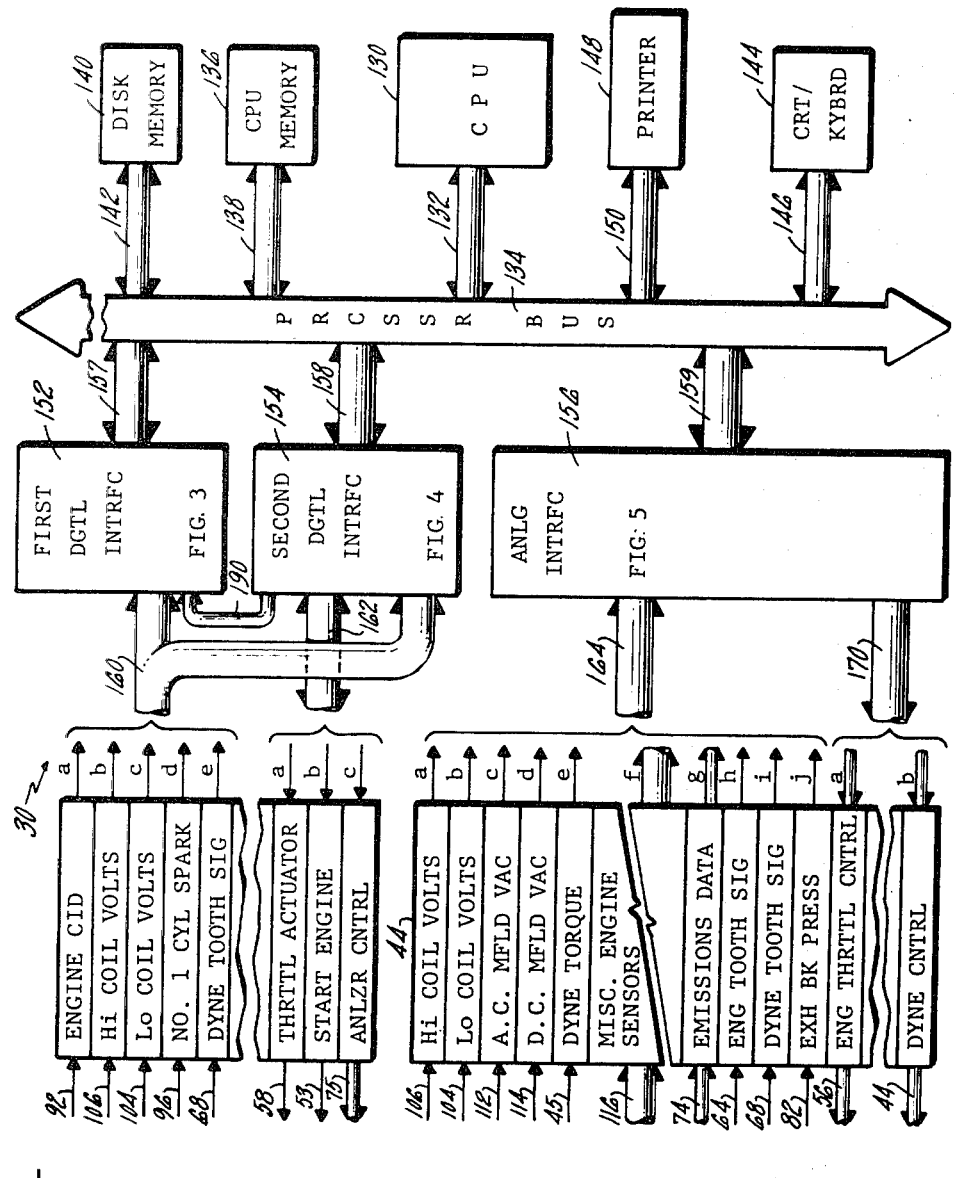
FIG. 2 is a system block diagram of a hot-test control system which may incorporate the present invention.

With the test engine connected to the load dyne 36 and instrumented as shown in FIG. 1, the hot-test control system automatically programs the start-up (cranking), ignition, and running of the engine at prescribed engine speed (RPM) and engine load conditions. Referring now to FIG. 2, a hot-test control system 30 which may incorporate the present invention includes a central processing unit (CPU) 130 which preferably is a known, proprietary model general purpose computer, such as the Digital Equipment Corporation (DEC) Model PDP-11/34 microcomputer which may be used with a software data system based on the DEC RXS11-M multi-task real time software package. The size of the CPU depends on the data processing tasks of the system, so that depending on the hot-test system requirements, a smaller microcomputer, such as the DEC LSI-11, may be used for the CPU. Similarly, a number of smaller CPUs may be used, each dedicated to a particular aspect or function of the system. The selection of the particular type of CPU to be used is one which may be made by those skilled in the art, based on system through-put requirements. It should be understood, however, that selection of the particular type of CPU is dependent on overall hot-test requirements alone, and forms no part of the present invention. If it is considered necessary, or practical, any one of a number of known processing systems and softward packages may be used as may be obvious or readily apparent to those skilled in the art.

As known, the CPU involves general purpose registers that perform a variety of functions and serve as accumulators, index registers, etc. with two dedicated for use as a stack pointer (the locations, or address of the last entry in the stack or memory) and a program counter which is used for addressing purposes and which always contains the address of the next instruction to be executed by the CPU. The register operations are internal to the CPU and do not require bus cycles. The CPU also includes: an arithmetic logic unit (ALU), a control logic unit, a processor status register, and a read only memory (ROM) that holds the CPU source code, diagnostic routines for verifying CPU operation, and bootstrap loader programs for starting up the system. The CPU is connected through input/output (I/O) lines 132 to a processor data bus 134 which includes both control lines and data/address lines and functions as the interface between the CPU, the associated memory 136 which is connected through I/O lines 138 to the data bus, and the peripheral devices including user equipment.

The memory 136 is typically nonvolatile, and may be either a core memory, or preferably a metallic oxide semiconductor (MOS) memory with battery backup to maintain MOS memory contents during power interruption. The MOS memory may comprise one or more basic MOS memory units, such as the DEC MOS memory unit MS11-JP each having 16K words of memory location, as determined by system requirements. The memory is partitioned into several areas by the system application software, as described hereinafter, to provide both read only, and read/write capability.

The peripheral devices used with the CPU and memory, other than the user interface devices, may include: (1) a disk memory loader 140, such as a DEC Pac Disk Control unit with two disk drives, connected through I/O lines 142 to the bus, (2) a CRT/keyboard terminal 144, such as DEC ADDS model 980, connected through I/O lines 146 to the bus, and (3) a printer 148, such as the DEC LA 35 printer, connected through I/O lines 150. The printer and disk loader are options, the disk memory loader being used to store bulk engine data or specific test routine instructions on floppy disks, which may then be fetched by the CPU. Alternatively, the specific test routines may be stored in the memory 136 such that the disk memory loader is used to store only bulk data.

The CRT/keyboard unit provides man-machine interface with the control system which allows an operator to input information into, or retrieve information from the system. These man-machine programs may include general command functions used to start, stop, hold, or clear various test routines, or to alter engine speed or dyne torque set point values for the engine throttle and dyne control circuitry. In addition, a specific "log-on" procedure allows the operator to alter the engine specification data stored in a data common portion of the memory 136.

The user interfaces include first and second digital interfaces 152, 154, and analog interface 156, connected through I/O lines 157-159 to the processor bus. Each digital interface receives the sensed engine data from the digital I/O interconnect 54 on lines 160. The digital interface 154 provides the required control system output discrete signals to the test engine instrumentation through lines 162 to the digital I/O interconnect. The sensed engine data presented to the analog I/O interconnect 44 is presented through lines 164 to the analog interface which provides the control system set point reference signals for the engine throttle and dyne control circuitry on lines 170 back to the analog interconnect.

In the operation of the CPU 130 and memory 136 under the application software for the system, the memory is partitioned into a number of different areas, each related to a different functional aspect of the application software. As used here, the term application software refers to the general structure and collection of a coordinated set of software routines whose primary purpose is the management of system resources for control of, and assistance to, the independently executable test programs described individually hereinafter. The three major areas of the memory include: (1) a library area for storing a collection of commonly used subroutines, (2) a data common area which functions as a scratch pad and which is accessible by other programs in memory which require scratchpad storage, and (3) a general data acquisition program area which includes routines for: collecting raw data from the user interfaces and storing the raw data in data common, deriving scaled, floating point data from the raw data, and a safety monitor subroutine which monitors some of the incoming data for abnormal engine conditions such as engine overspeed, low oil pressure, and excessive engine block temperature. In addition to the three main program areas, a further partition may be provided for a test sequencer program which functions as a supervisory control of the engine hot-test sequence of operations.

The data common area is partitioned into subregions for: (1) storing the sensed raw data from the user interfaces, (2) storing scaled data derived from the stored sensed data by use of selected conversion coefficients, (3) storing engine model specifications such as number of cylinders, firing order, CI sensor mounting hole angle, number of ring-gear teeth, etc., and (4) storing a description of the desired test plan (a list of test numbers).

The areas in memory dedicated to the various test plans stored in data common (4) include a test module partition in which the engine tests requested by the test sequencer program are stored during execution of the test. The tests stored represent separately built program test routines executed during hot-test, that have a name format "TSTXXX" where XXX is a three-digit number. The test routines themselves are stored either in a further partition of the memory 136 or, if optioned, stored on floppy disks and read into the test module partition from the disk driver.

Each CPU instruction involves one or more bus cycles in which the CPU fetches an instruction or data from the memory 136 at the location addressed by the program counter. The arithmetic operations performed by the ALU can be performed from: one general register to another which involves operations internal to the CPU and do not require bus cycles (except for instruction fetch), or from one memory location or peripheral device to another, or between memory locations of a peripheral device register and a CPU general register; all of which require some number of bus cycles.

In the control system embodiment of FIG. 2, a combination interrupt/noninterrupt mode of operation is selected, although if desired, total noninterrupt may be used with further dedicated programming. The digital interfaces 152, 154 establish the processor interrupt mode of operation in which the CPU reads particular sensed engine data from the analog interface in response to specific events occurring within each engine cycle. The interrupt mode includes several submodes in which the CPU is directed to read specific input parameters, or combinations of parameters, depending upon the selected test. Each of the interrupts have an associated vectored address which directs the CPU to the particular input channels, or the locations in memory associated with the particular analog channel. These vectored interrupts are used to cause the CPU to read at the particular selected interrupt time: (a) engine cam angle alone, (b) cam angle and one or more analog channels, (c) one or more analog channels without cam angle, and (d) the spark duration counter (described hereinafter with respect to FIG. 4). In the absence of interrupts, i.e., the noninterrupt mode of operation, the CPU reads the data provided at the analog interface continuously as a stand alone device. In this noninterrupt mode, the sample sequence and sample time interval, typically one second, is ordered by the general data acquisition routine which stores the raw data in the memory data common location.

The interface 152 provides the interrupts required to synchronize the CPU data acquisition to specific, selected events within the engine cycle. This is provided by synchronizing the CPU interrupts to crankshaft angle position by: (1) sensing instantaneous crankshaft angle position from the dyne tooth signal information, and (2) detecting the crankshaft synchronization point (the TDC of the #1 cylinder power stroke) by sensing the CI signal from the CI sensor (90, FIG. 1) together with the number one cylinder firing as provided by the spark sensor (94, FIG. 1), as described hereinafter. With the crankshaft index marking the beginning of each engine cycle, the dyne tooth signal provides information on the instantaneous crankshaft angle position from this crankshaft synchronization point, such that the entire ignition cycle may be mapped. As a result, cam cycle and subcyclic information related to specific cylinder events within the ignition cycle may be accurately tagged as corresponding to known crankshaft angle displacement from the synchronization point. The interface 152 then interrupts the processor at predetermined locations within the engine cycle, each identified by a particular crankshaft angle value stored in the memory 136 and associated with a particular engine cycle event. In addition, the interface 152 also provides CPU interrupt for: (1) the presence of number one cylinder spark ignition pulse, (2) the rising edge of the Lo coil voltage signal (which indicates the availability of the KV voltage to fire the sparkplug), (3) the CI signal, and (4) a discrete SPARK DURATION DATA READY signal provided from the digital interface 154 (described hereinafter with respect to FIG. 4).

Figure 3:
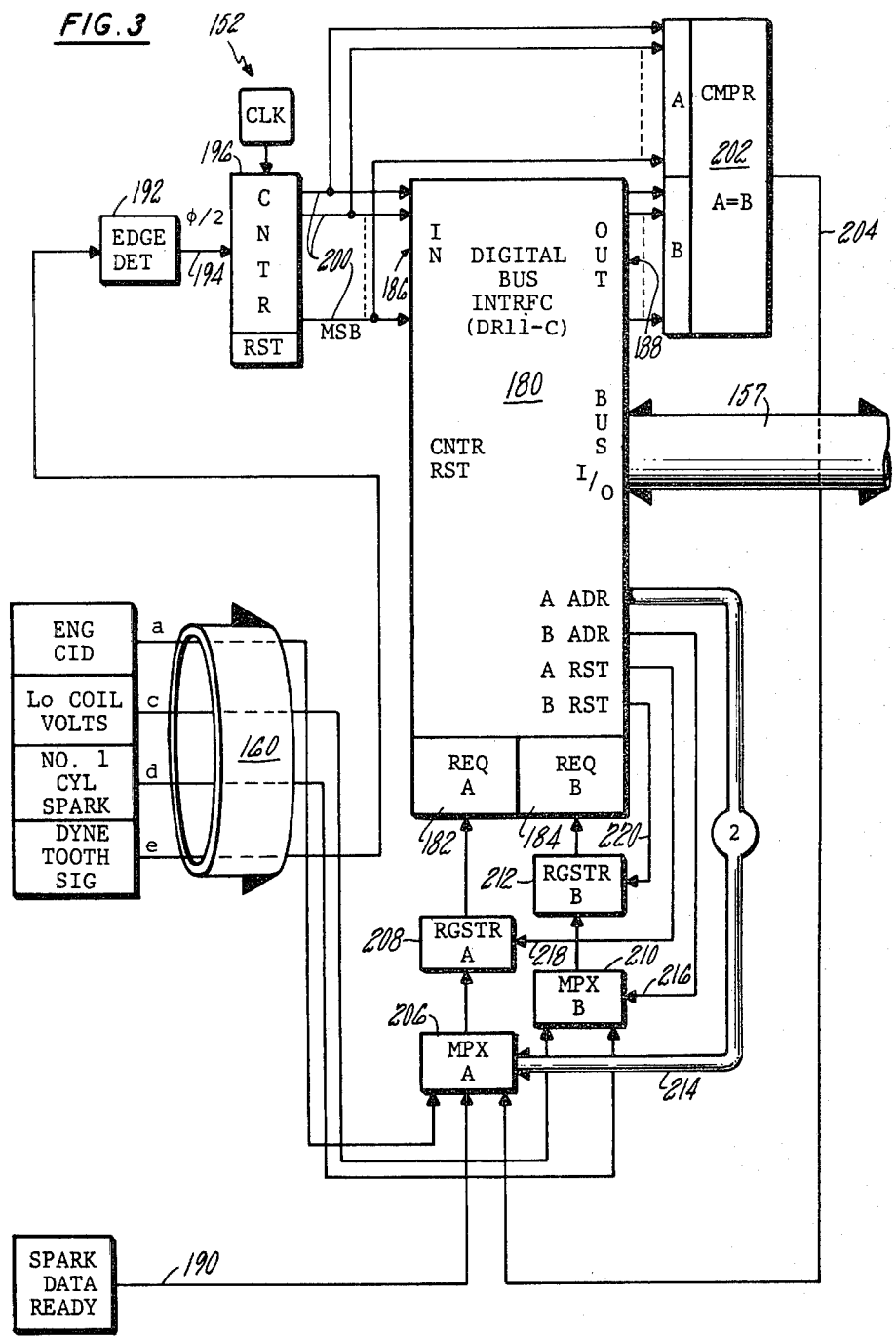
FIG. 3 is a system block diagram illustration of one subsystem as may be used in the control system embodiment of FIG. 2.

Referring now to FIG. 3, the interface 152 includes a general purpose, parallel in/out bus interface 180, such as the DEC DR11-C, which interfaces the processor bus 134 to the signal conditioning circuitry illustrated. As known, the DR11-C includes a control status register, and input and output buffer registers, and provides three functions including: (1) address selection logic for detecting interface selection by the CPU, the register to be used, and whether an input or output transfer is to be performed, and (2) control logic which permits the interface to gain bus control (issue a bus requests) and perform program interrupts to specific vector addresses. The interrupts are serviced at two inputs of the bus interface; REQ A input 182, and REQ B input 184. Each input responds to a discrete presented to the input and, in the presence of such a discrete, generates the bus request and interrupt to the CPU over the bus I/O line 157. The interface also includes 16 pin user input and output connections 186, 188 for data transfer between the signal conditioning circuitry and the processor.

The interface 152 receives: the engine CI, the Lo-Coil signal, the number one cylinder spark ignition signal, and the dyne raw tooth signal on lines 160 from the digital interconnect 54, and the SPARK DATA READY signal on a line 190 from the interface 154. The dyne tooth signal is presented to an edge detection circuitry 192 which detects the rising and falling edges of each raw dyne tooth pulse and provides a signal pulse for each, resulting in a doubling of the frequency, i.e., X 2 pulse count for each camshaft cycle (engine cycle). The conditioned dyne tooth signal is presented on an output line 194 as a series pulse signal at a frequency twice that of the raw tooth signal. For a dyne tooth count of 256 teeth the conditioned tooth signal provides 512 pulses per crankshaft revolution; each pulse-to-pulse interval defines a crankshaft angle increment equal to 360°/512, or 0.703°. Since each camshaft cycle is equal to two crankshaft revolutions, or 720°, the camshaft angle measurement revolution provided by the conditioned tooth signal is better than 0.1%.

The conditioned dyne tooth signal on the line 194 is presented to a ten bit counter 196 which counts the conditioned tooth signal pulses and provides a 10 bit binary count on lines 200 to the input 186 of the digital interface 180. The counter 196 provides a continuous count of the tooth pulses, continuously overflowing and starting a new 10-bit count. The count output from the counter 196 is also presented to one input (A) of a comparator 202 which receives at a second input (B) a 10-bit signal from the user output 188. The comparator provides a signal discrete on an output line 204 in response to the condition A=B.

The CI signal, the SPARK DATA READY signal, and the output of the comparator 202 on the line 204, are presented to the input of a multiplexer (MPX) 206, the output of which is presented to a buffer register 208. The Lo-coil voltage signal and the number one cylinder spark signal are each presented to a second MPX 210, the output of which is connected to a second buffer register 212. The outputs of the registers 208, 212 are connected to the interrupt inputs 182, 184 of the bus interface. The signal select function provided by the MPX's 206, 210 is controlled by address signals from the CPU on the bus interface output lines 214, 216. The address signals select the inputs called for by the CPU depending on the particular test routine or engine condition to be monitored at the particular time. The interface 180 also provides reset discretes for the registers 208, 212 on lines 218, 220 following the receipt of the buffered discrete at the interrupt inputs.

In opertion, the control system acquires camshaft synchronization by having the CPU provide a SELECT CI address signal on lines 214 to the MPX 206. The next appearing CI signal is steered into the register 208 and read at the input 182. The interface generates a bus request and an interrupt back through the data bus to the CPU, which when ready, responds to the interrupt by reading the counter output on the lines 200. The count value is stored in data common. The CPU processes a number of CI interrupts, each time reading the counter output. The ten bit counter provides alternating high and low counts on successive CI interrupts, corresponding to TDC of the power stroke and intake stroke of each engine cycle. Typically, the count samples at alternate interrupts are averaged to provide two average count signals corresponding to the two interrupts in each cycle. The CPU next requests the number one cylinder spark discrete by outputting a READ NO. 1 SPARK address signal on the line 216 to the MPX 210. In response to each spark signal interrupt, the CPU reads the output of the counter 196. Since the spark discrete signal appears only once in each engine cycle, as opposed to the twice appearing CI signal, the count corresponding to the spark discrete is compared to the two averaged count signals for the CI interrupt. The CI count closest to that of the spark count is selected as the CI corresponding to the number one cylinder power stroke. The CI sensor crankshaft angle displacement from true TDC is read from memory and the equivalent angle count is added to the selected CI count ($CI_p$) to provide the crankshaft synch point count which is stored in memory. The difference count between the spark count and synch point count represents the engine timing angle value, which is also stored in memory. The subroutines for camshaft sychronization are described hereinafter with respect to FIG. 7.

With the engine cam cycle defined by the stored count in memory the CPU may specify particular camshaft angles at which it desires to read some of the engine sensed parameters. This is provided by reading the desired cam angle value from the memory 136 to the output 188 of the interface 180, i.e., the B input of the comparator 202. In response to the count on the lines 200 from the counter 196 being equal to the referenced count, the comparator provides a discrete to the MPX 206, which is addressed to the comparator output by the appropriate "SELECT COMPARATOR" address on the lines 214. This interrupt is serviced in the same way providing a vectored address to the CPU and steering it to the particular one of the analog input channels.

Figure 4:
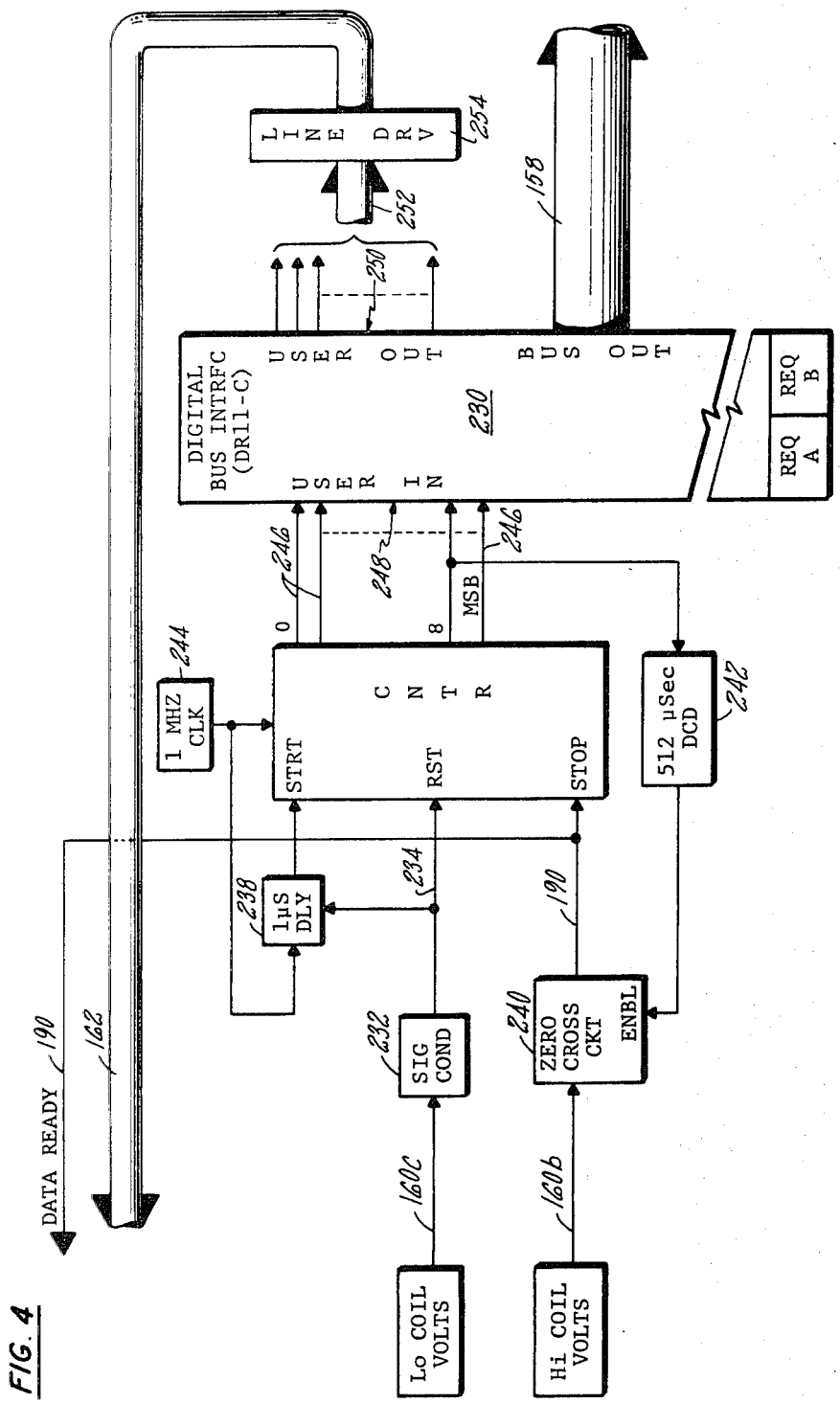
FIG. 4 is a system block diagram illustration of another subsystem as may be used in the control system embodiment of FIG. 2.

Referring now to FIG. 4, the digital interface 154 also includes a digital bus interface 230, such as a DR11-C. The interface 154 receives the sensed engine discrete signals including the Hi-coil and Lo-coil voltage signals on lines 160. The Lo-coil signal is presented to signal conditioning circuitry 232 which squares up the leading edge of the signal and provides the conditioned signal on a line 234 to the reset (RST) input of a twelve bit counter 236 and to the enable (ENBL) input of a one-shot monostable 238. The Hi-coil signal is presented to a zero crossover circuit 240 which when enabled provides the SPARK DATA READY signal on the line 190 in response to the presence of a zero amplitude, i.e., crossover of the Hi-coil signal.

As described hereinafter with respect to the sparkplug load tests, each Hi-coil voltage signal which is representative of successive sparkplug voltage signals includes an initial KV peak voltage followed by a plateau representative of the actual plug firing interval. The peak KV portion is followed by a ringing of the waveform which, in some instances, may be detected by the zero crossover circuit as a true crossover, therefore, the crossover circuit is enabled only after a selected time interval following the leading edge of the Lo-coil signal. The enable is provided by a decode circuit 242 which senses the output of the counter 236 and in response to a count greater than that corresponding to a selected time interval, typically 512 microseconds, provides an enable gate to the zero crossover circuit. The SPARK DATA READY discrete from the zero crossover circuit is provided both to the input of the digital interface 152 and to a stop (STP) input of the counter 236. A one megahertz signal from a clock 244 is presented to the count input of the counter 236 and to the input of the monostable 238, the output of which is presented to the start (STRT) input of the counter.

The counter functions as an interval timer and provides an indication of the time interval between the Lo-coil leading edge and the Hi-coil zero crossover which corresponds to the time duration of the sparkplug voltage signal. In operation, the leading edge of the conditioned Lo-coil signal resets the counter and triggers the monostable which, following a prescribed delay (typically one clock period) starts the counter which then counts the one megahertz clock pulses. In response to a lines 246 count greater than 512, the decode 242 provides the enable to the zero crossover circuit. At the Hi-coil crossover, the crossover circuit provides the SPARK DATA READY discrete on the line 190, which stops the counter and if selected by the CPU, interrupts the CPU via the digital interface 152. The interrupt causes the CPU to read the count at input 248 of the bus interface as an indication of the time duration of the sparkplug firing voltage. Typically, this sparkplug duration count is read continuously by the CPU, which with the synchronization to the camshaft angle identifies each sparkplug signal with its associated cylinder.

The bus interface 230 also provides at a user output 250 the digital discrete signals corresponding to the START ENGINE signal, and the discrete signals associated with the throttle actuator (56, FIG. 1) and with control of the emissions analyzer (70 FIG. 1). These discrete enable signals to the analyzer include flush, sample, drain, and sample intake commands which cause the analyzer to function in a program, all of which is known in the art. All of the discretes are presented through output lines 252 to line drivers 254, the output of which is presented through the lines 162 to the digital interconnect 54.

Figure 5:
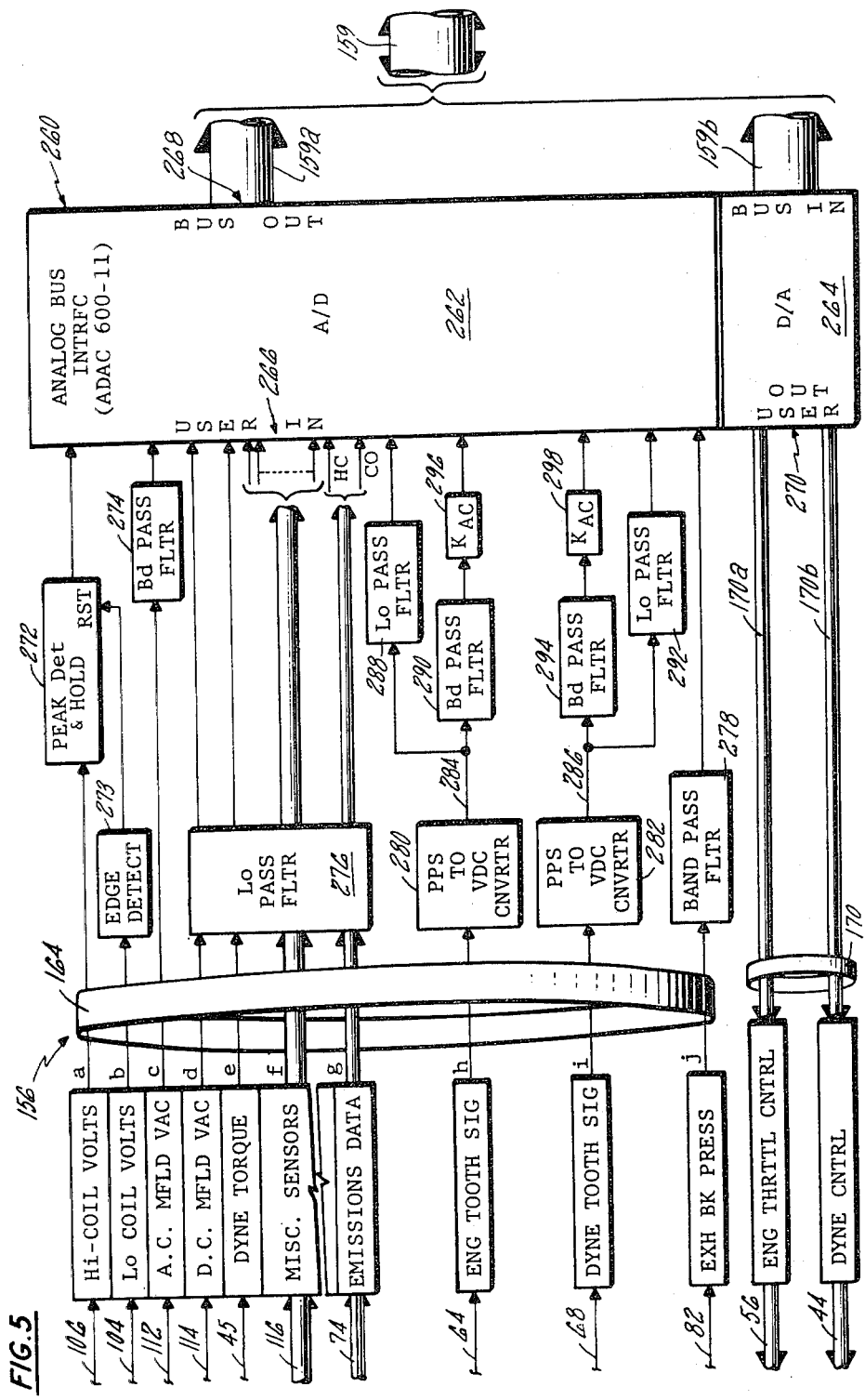
FIG. 5 is a system block diagram illustration of still another subsystem as may be used in the control system embodiment of FIG. 2.

Referring now to FIG. 5, the analog interface 166 includes an analog bus interface 260, such as the DEC model ADAC600-11, having input/output sections 262, 264. The input section includes a series of data acquisition channels connected to a user input 266, and an analog-to-digital (A/D) converter for providing the digital binary equivalent of each sensed analog parameter through the bus output 268 and lines 159a to the processor bus. The output section includes a digital-to-analog (D/A) converter which receives the CPU output signals to the engine on lines 159b and provides the analog signal equivalent of each at a user output 270. The CPU output signals include: the setpoint reference signals for the engine throttle control and the torque setpoint reference signal for the dyne control all included within the lines 170 to the analog interconnect.

The sensed engine signals presented to the analog interface are signal conditioned prior to input to the bus interface. The Hi-coil voltage signal on line $164_a$ is presented to a peak detector 272 which samples and holds the peak KV value of the signal, and this sampled peak value is presented to the bus interface. The peak detector is resetable by an engine event discrete, such as the trailing edge of low coil from the Lo-coil signal conditioner 273 in the interface 156. The AC manifold signal is presented through a band pass filter 274 to the bus interface. The limits of the band pass filter are selected in dependence on the number of engine cylinders and the range of engine test speeds. The DC manifold vacuum signal, the dyne torque signal, the miscellaneous sensed signals including engine oil, water and fuel temperatures and pressures, and the emissions data (lines $164_{d-g}$) are coupled to the bus interface through low pass filters 276 which reject any spurious noise interference on the signal lines. The exhaust back-pressure sense signal on a line $164_j$ is presented to a band pass filter 278 prior to presentation to the bus interface, with the limits selected based on the particular engine and speed range.

The engine raw tooth signal and the dyne raw tooth signal on the lines $164_{h'i'}$ are presented to associated frequency to DC converters 280, 282. The output signals from the converters, which include DC and AC components of the tooth signals, are provided on lines 284, 286 to associated band-pass and low-pass filters. The converted engine tooth signal is presented to low pass filter 288 and band-pass filter 290, and the converted dyne tooth signal is presented to low-pass filter 292 and band-pass filter 294. The DC signals from the low-pass filters 288, 292 provide the DC, or average engine speed ($N_{av}$) for the engine and load, and are presented directly to the bus interface. The AC signal outputs from the band-pass filters, whose limits are selected based on the same considerations given for filters 274, 278, are presented through AC amplifiers 296, 298 to the associated channels of the input interface 262 as the indications of the instantaneous, or AC speed (N) of engine and load.

Figure 6:
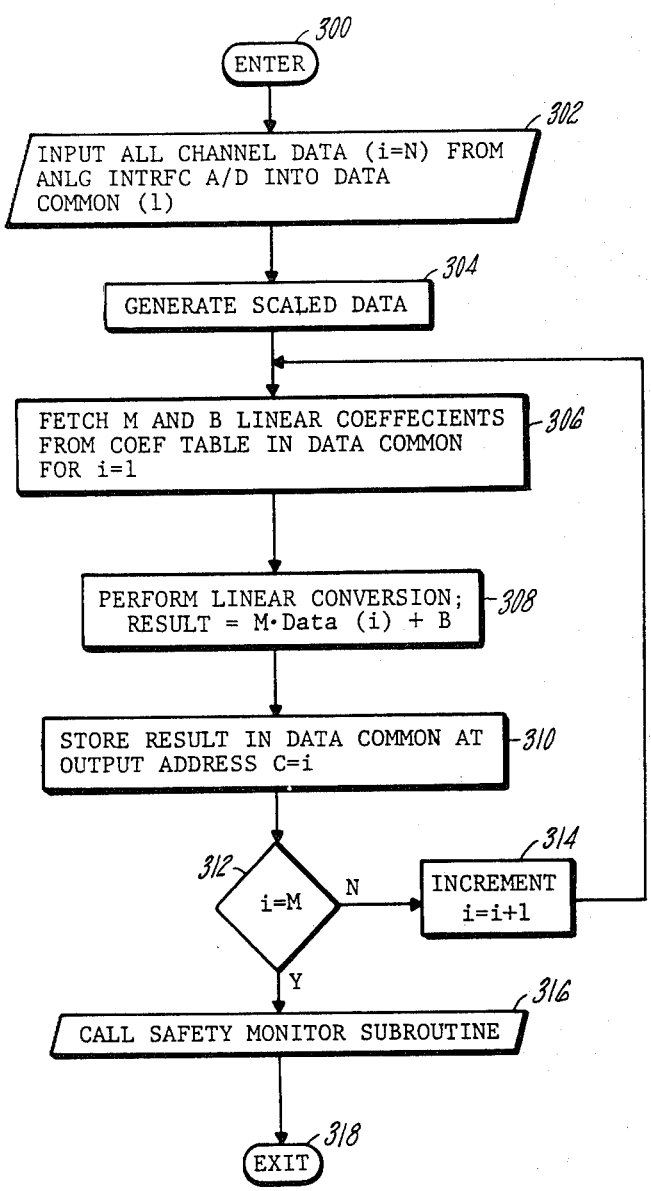
FIG. 6 is a simplified logic flowchart diagram illustrating one functional aspect of the control system of FIG. 2.

As described hereinbefore, the general data acquisition routine collects the data from the analog bus interface 260 at a prescribed sample cycle, typically once per second. The raw data is stored in one section of the data common partition of the memory 136 and a data acquisition subroutine generates a set of scaled data from the raw data using linear conversion coefficients stored in a coefficient table in memory. This second set of data is a properly scaled set of floating point numbers and is used primarily by the dynamic data display programs (for display on the CRT, FIG. 2) and for particular test subroutines which require slow speed data). In addition, the general data acquisition routine may also execute a safety monitor subroutine which checks for overtemperature of the engine block and also low engine pressure limits. Referring now to FIG. 6, in a simplified flow chart illustration of the general data acquisition routine the CPU enters the flow chart following terminal interrupt 300 and executes the subroutine 302 which requires the sampling of all A/D data channels (i=N) from the analog bus interface (260, FIG. 5). The raw data read from the A/D is stored in data common. Following the raw data acquisition subroutine 304 calls for providing a scaled set of data from that sampled in 302. This begins with process 306 which requests the CPU to fetch the linear coefficients (M,B) associated with the particular data channel (i=N) from a coefficient table in data common. Process 308 request the linear conversion of the raw data to the scaled result, after which instructions 310 call for storage of the scaled data in data common at an address C=i. Decision 312 determines if the last conversion was also the last channel (i=N) and if NO then instructions 314 requests an increment of the CPU address counter to the next address and the conversion subroutine is again repeated for each of the raw data values. Following the completion of the linear conversion subroutines (YES to decision 312) the safety monitor subroutine 316 is executed.

Figure 7A:
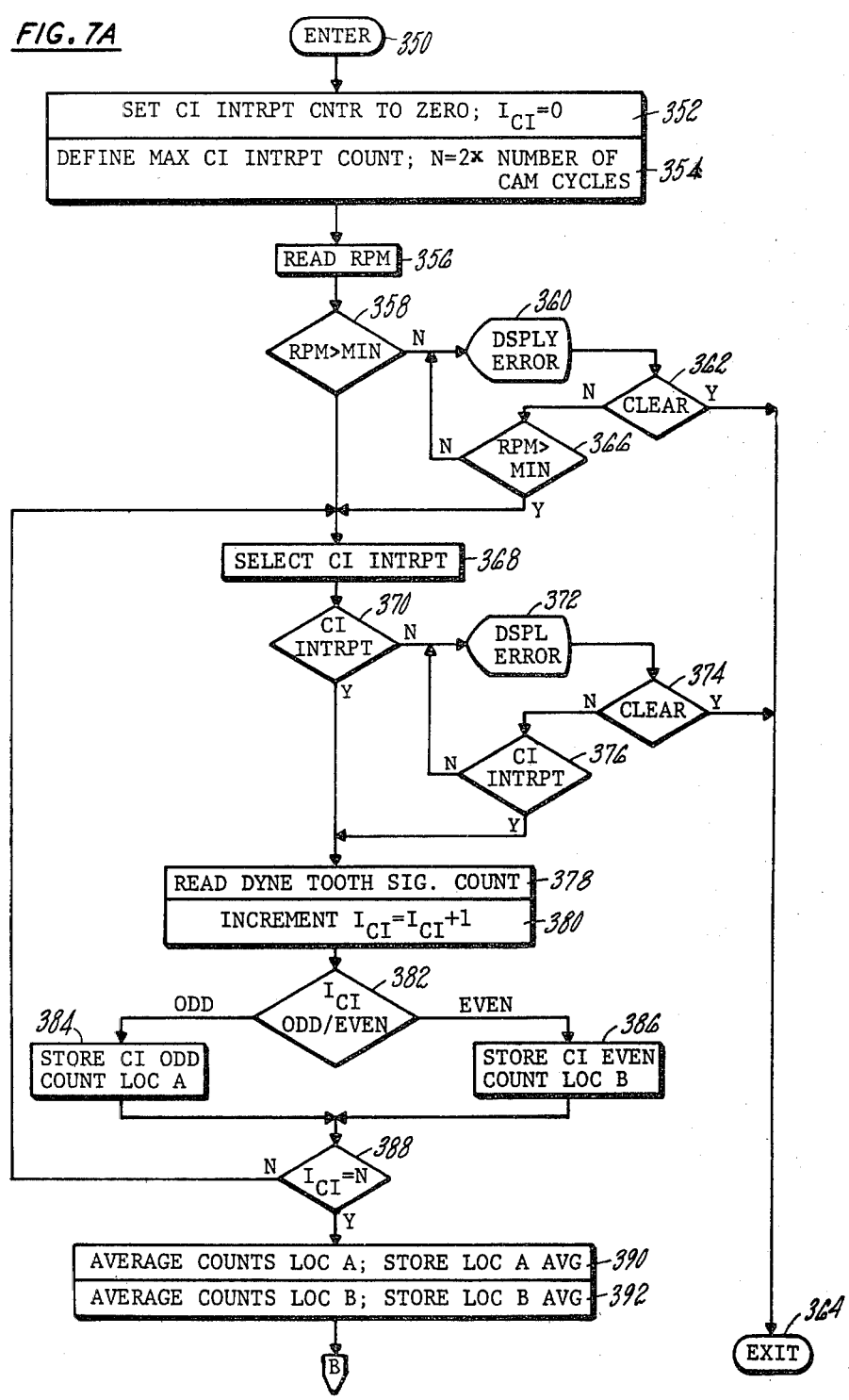
FIG. 7 A, B is a simplified logic flowchart diagram illustrating one function of the present invention as performed by the control system of FIG. 2.

All of the engine test routines acquire initial value data relating to load speed and torque as well as engine timing and crankshaft synchronization prior to taking the particular test routine engine data. The analog values relating to load speed and torque are obtained under the general acquisition routine. The engine timing and crankshaft synchronization is obtained under a separate subroutine. Referring now to FIG. 7, which is a simplified flowchart illustration of a preferred engine timing and synchronization subroutine, the CPU enters the subroutine at 350 (FIG. 7A) and instructions 352 request the CPU to set the crankshaft index (CI) interrupt counter at zero. Instructions 354 request a max. CI interrupt count of N which is equal to twice the number of desired cam cycles of data (M) since the crankshaft index sensor (90, FIG. 1) provides two pulses in each cam cycle. Instructions 356 next request the read of average engine RPM from data common. Decision 358 determines if the actual engine speed is above a minimum speed required to insure valid data. If NO, instructions 360 display an error on the CRT, (144, FIG. 2) followed by decision 362 which determines if an operator entered CLEAR has been made. If there is a CLEAR of the test then the CPU exists the subroutine at 364. In the absence of an operator CLEAR the CPU waits in a loop for the minimum speed condition to be established. This is provided by decision 366 which determines if the latest RPM is greater than minimum, and if NO then continues to display the error and look for a CLEAR in 360, 362. Once the minimum RPM has been exceeded, instructions 368 request the CPU to select CI INTRPT which results in the address select to the MPX 206 of the digital interface 152 (FIG. 3) which monitors the CI pulse signal provided on a line $160_a$.

Decision 370 monitors the CI interrupt and in the absence of an interrupt displays an error in instructions 372, and looks for an operator CLEAR in instructions 374. If a CLEAR is entered the CPU exits at 364, and if no CLEAR then decision 376 monitors the presence of a CI interrupt. Following a CI interrupt instruction 378 requests a read of the dyne tooth signal count provided by the counter 196 (FIG. 3). The CPU increments the interrupt counter in instructions 380 to mark the dyne tooth count and decision 382 determines if the present interrupt is odd or even. If odd the count is stored at location A and if even it is stored at location B (instructions 384, 386). Decision 388 next determines if the interrupt is at the max count N and if not then branches back to instructions 368 to set up the next CI interrupt data acquisition. If the maximum number of interrupts have been serviced instructions 390 and 392 request the averaging of all the stored count data in each of the locations A, B to provide an average A count and an average B count.

Figure 7B:
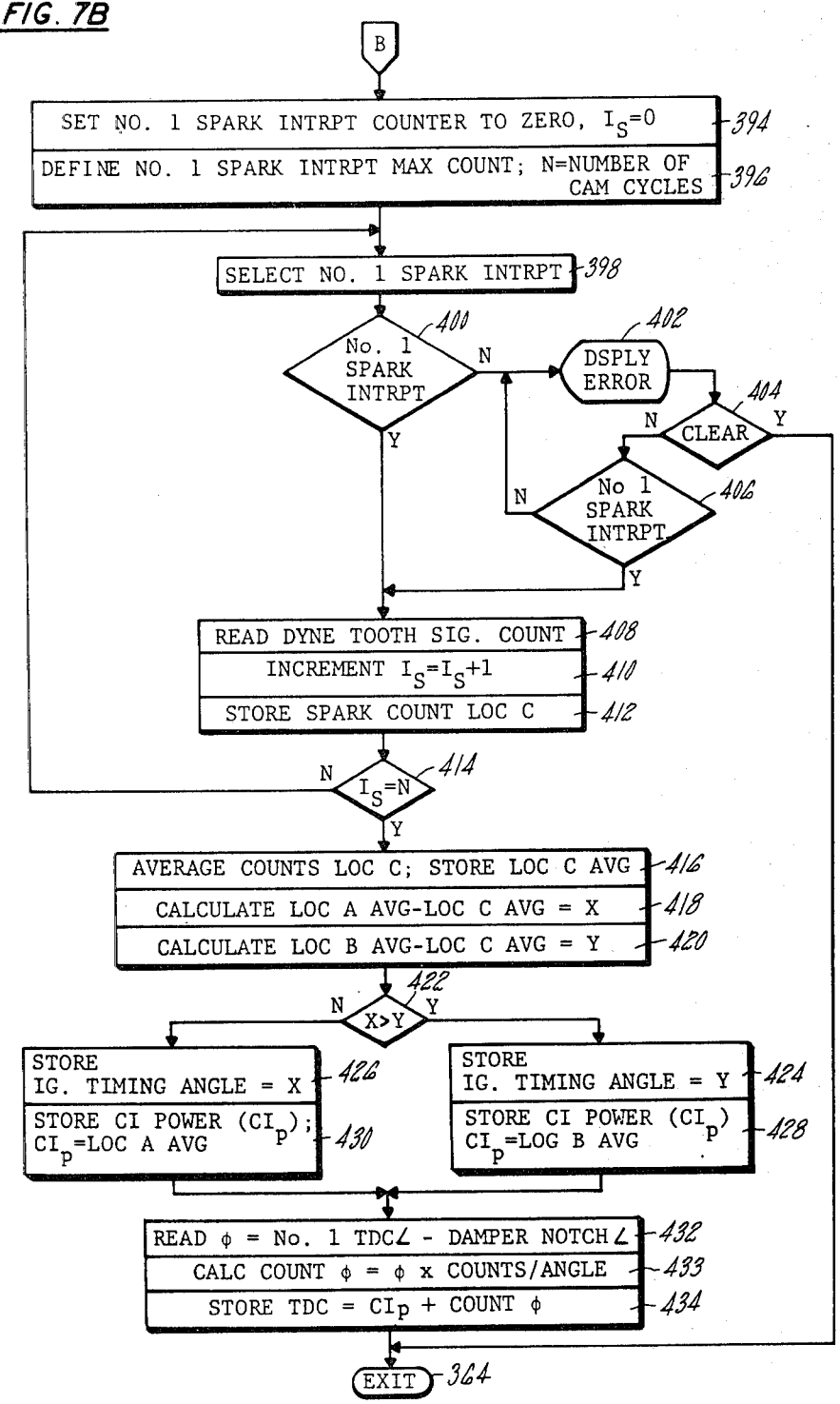

The CPU must identify which of the two interrupts occurring within the cam cycle is associated with the TDC of the #1 cylinder power stroke. This is provided by an acquiring the cam angle data associated with #1 cylinder spark ignition. In FIG. 7B, instructions 394 set the #1 spark interrupt to zero and instructions 396 define the max spark interrupt count as M equal to the number of cam cycles of data to be acquired. The CPU then executes the subroutine to determine the cam angle position corresponding to the #1 spark ignition. This begins with instructions 398 to select a NO 1 SPARK INTRPT. The decision 400 looks for the presence of a spark interrupt and if no interrupt appears within a predetermined time interval the CPU again goes into a waiting loop which begins with the display of an error in 402 and the monitoring of an operator entered CLEAR in decision 404. If an operator clears entered the CPU exits the subroutine at 364. If no CLEAR, then the presence of a spark interrupt is continuously monitored in instructions 406.

Following a spark interrupt, instructions 408 read the dyne tooth signal count. Instructions 410 increment the spark interrupt counter by one and instructions 412 call for the storage of the spark count value at location C. Decision 414 determines if this is the last spark interrupt to be serviced, and if not the CPU branches back to instructions 398 to set up for the next interrupt data read. Following the requested number of interrupts, instructions 416 request the averaging of all the count stored at location C to provide a C average count value.

With this information available, the CI interrupt associated with TDC of the power stroke can be determined by comparing the two CI counts (odd/even) to the spark interrupt count. This is provided in instructions 418 et seq which first calls for calculating the difference (X) between the average A and the average C counts. Instructions 420 request the determination of the count difference (Y) between the B average and the C average counts. Decision 422 compares the X and Y counts to determine which is the largest. If the X count is larger, than instructions 424 store the Y difference count as that representative of the engine timing angle value. Similarly, instructions 426 call for storing the X count as the engine timing angle if it is the smaller of the two count differences. Instructions 428, 430 request the CPU store of the crankshaft index power ($CI_p$) as being equal to the count of the B average, or the A average, respectively. In other words, the particular one of the two counts received in the CI interrupt closest to the count corresponding to the spark interrupt is then considered to be the $CI_p$ of #1 cylinder. Instructions 432 request the CPU to read the angle ($\phi$) defined by the engine manufacturer for the particular engine which represents the angular displacement between the mounting hole for the CI sensor in the damper housing and the instantaneous position of the damper notch at true TDC of #1 cylinder. Instructions 433 next request the equivalent count value associated with the displacement angle, and instructions 434 request the calculation of the cam cycle synchronization point, or true TDC of #1 cylinder power stroke, as the sum of the crankshaft index of the power stroke plus the count increment associated with the displacement angle. Following instructions 434, the CPU exits the program at 364.

With the CPU synchronization to the engine crankshaft, the sensed engine data at the analog interface 158 (FIG. 2) may be sensed at any selected crankshaft angle increment, down to the 0.7 degree resolution provided by the conditioned dyne tooth signal to the interface 152. The particular selection of angle increment depends on the resolution accuracy required of the measured data, or the frequency of data change with crankshaft angle. Typically, the selected angle increments may be three or four times greater than the achievable angle resolution, the limitation due primarily to the processor overhead time, i.e., the inability of the processor to gain access to and process the data within the equivalent real time interval associated with the 0.7 degree crank angle interval. In general, each test routine includes its own, dedicated data acquisition subroutine for the particular parameter of interest. The various tests read out the slower engine speed data from data common, as provided by the general data acquisition routine. This slower data includes, among others, the sensed miscellaneous sensors (115, FIG. 1) data relating to oil and water temperatures, the choke position, and the average speed and load torque values, as may be necessary to determine if the engine prequisite conditions have been established prior to test.

The description thus far has been of a hot-test installation and control system which is capable of providing a number of different automated tests for determining the performance of the test engine. The instrumentation described with respect to FIG. 1, and the control system of FIGS. 2-5 together with the description of the application software including the general data acquisition, are illustrative of that required for a hot-test system capable of providing such a number of different performance tests. The present invention may be incorporated in such a system; its use and implementation in such a system, as described in detail hereinafter, represents the best mode for carrying out the invention. It should be understood, however, that the invention may be implemented in a simpler system which includes the engine load, but which includes only that sensing, signal conditioning, and signal processing apparatus required for direct support of the invention.

In the present invention the relative power balance between the cylinders of an engine under load is obtained by comparing the sub-cyclic fluctuations, or delta values in net engine torque produced by each cylinder over one engine cam cycle. The term net engine torque refers to the difference between the torque value measured at the engine flywheel and the torque value measured at the load. For a constant full cycle, or average engine speed and a constant load torque, the average net torque is zero. However, the fluctuations or delta values in engine speed within an engine cycle, i.e. sub-cyclic speeds, produced by individual cylinder firing within the cycle, results in sub-cyclic angular acceleration of the engine crankshaft and sub-cyclic fluctuations of the torque at the engine flywheel and the load. Since the fluctuations in engine torque are the direct result of the individual cylinder's performance, the relative magnitudes of the fluctuations provide an indication of the relative power balance between cylinders. The difficulty, however, is that the fluctuations in torque at the engine and load are out of phase due to the spring modulus of the coupling (34, FIG. 1) and the rotational inertia of the load resulting in an error component in the apparent torque measured at the engine flywheel. Since the actual sub-cyclic fluctuations in engine torque are small to begin with, in comparison to the average engine torque output, the error contribution of the load is considerable and defeats the ability to obtain a resolute power balance indication. As such the present invention determines the sub-cyclic fluctuations in the net engine torque or, as referred to hereinafter, the net engine delta torque which is equal to the difference in the sub-cyclic fluctuations in engine torque (engine delta torque) and load torque (load delta torque), all of which is described hereinafter with respect to FIGS. 8-10.

The present invention may be used to provide relative power balance measurements in any type of IC engine, both spark ignition and diesel, without limitation to the number on configuration of the cylinders of their firing order. The invention may be used alone or may be used together with other test procedures in an overall hot-test system employing test procedures disclosed and claimed in one or more of the hereinbefore referenced copending U.S. patent applications.

Referring now to FIG. 8, the vectors 450 in illustration (a) depict the TDC of the cylinder power strokes for an 8-cylinder engine. The vectors are numbered 1 through 8 corresponding to the cylinder position in the firing order as measured from the camshaft synchronization point 452, obtained from the CPU to engine crankshaft synchronization described hereinbefore with respect to FIG. 7. From the synchronization point (452) a full cam cycle of 720° may be mapped with the nominally anticipated TDC positions for each cylinder. The waveform 454 represents an assumed composite of the instantaneous engine sub-cyclic speed (engine delta speed, $\Delta Ne$) values for the cam cycle of illustration (a), referenced to the average or full cycle engine speed ($Ne_{AV}$). The speed is for an assumed good engine and is obtained from the analog bus interface; the delta speed values from the AC amplifier 296 and the average values from the low-pass filter 288 (FIG. 5). In a similar manner, the waveform 460 of illustration (c) represents an assumed composite of instantaneous sub-cyclic load speed (load delta speed) values ($\Delta Nd$) obtained over one cam cycle and fluctuating about the average load speed value ($Nd_{AV}$).

As evident by comparison of the waveforms of illustrations (b) and (c) the delta load speed is out of phase with, and at a lower peak-to-peak amplitude than that of the engine delta speed. The phase shift and lower amplitude are due to the spring modulus of the clutch coupling (34, FIG. 1) which must be sufficiently flexible to prevent damage to the engine crankshaft and coupling during acceleration and deceleration of the engine under load. Another cause of the lower load delta speed amplitude is the natural resonant frequency of the dynamometer which is much less than the sub-cyclic frequencies at the typical engine test speeds. As a result, the load delta speed waveform tends toward saturation, i.e. slew rate limited.

As evident from the difference of the delta speed waveforms there exists a difference in sub-cyclic angular acceleration between engine and load such that the sub-cyclic delta torque values at the engine and load must also be different. Waveforms 470, 480 of illustrations (d) (e) represent composites of the instantaneous values of engine and load delta torque respectively, as may be obtained by differentiation of the engine and load delta speed waveforms of illustrations (b) (c). In the present invention the engine and load delta speed values are obtained as a function of engine crankshaft angle ($\theta e$) to provide identity of the individual sub-cyclic fluctuations as associated with a particular engine cylinder. As a result, differentiation of the engine and load delta speed values are first provided with respect to crankshaft angle as opposed to real time. Using known mathematical relationships the speed differentiated values $$\frac{d(\Delta Ne)}{d\theta}, d\frac{(\Delta Nd)}{d\theta}$$

are converted to angular velocity by use of the known derivative relationship $$\frac{d(f(\theta))}{dt} = \frac{d}{d\theta}(f(\theta)) \cdot \frac{d\theta}{dt}$$

and then to angular acceleration values, as described in detail in the analysis of Appendix A. To illustrate, the engine delta torque waveform 470 is obtained by first multiplying the point by point differentiated values of engine delta speed $$\frac{\Delta Nei + 1 - \Delta Nei}{\Delta \theta e},$$

by the crankshaft angular velocity $d\theta e/dt$ which is equal to the summation of the average engine speed plus the delta speed value obtained at each crankshaft interval, or $$\frac{d\theta e}{dt} = Ne_{AV} + \Delta Ne(\theta e).$$

Each resultant product is an indication of angular acceleration which is then multiplied by the rotational inertia value of the engine flywheel and a portion of the clutch coupling to provide representations of the instantaneous values of engine delta torque over the cam cycle.

In calculating the torque values the rotary inertia value is that of the engine flywheel plus a portion of the coupling. The other coupling portion being allocated to the load. These values are stored in data common in memory. The load delta torque waveform 480 of illustration (e) is obtained in a similar manner, and point by point summation of the engine and load delta torque values at equal crankshaft angle values produces a net engine delta torque waveform 490, as shown in illustration (f). As shown the net delta torque sub-cyclic fluctuations have a lower peak-to-peak amplitude and are phase shifted from the engine delta torque waveform 470. This amplitude change and phase shift results from removal of the load error contribution to the engine delta torque. The load torque contribution varies with the engine test speed and with the type engine under test, such that the error contribution is a variable which must be factored out to produce an accurate sub-cyclic torque indication i.e. the net delta torque, for analysis. Since the CPU maps the cam cycle based on the crankshaft synchronization to predict the location of each cylinder power stroke, the phase shifting introduced by the dyne load delta torque makes correlation of the sub-cyclic fluctuations in engine torque to the particular cylinder producing the fluctuation, or at the minimum inaccurate. This, as shown in FIG. 8 is true even for a normal engine, with the result being the possible rejection of an engine based on an inaccurate power balance measurements due solely to the load distortion of the engine delta torque waveform.

The load torque contribution to apparent engine torque is highly manifest during engine failures. To illustrate, in FIG. 9 it is assumed that cylinder 5 has an ignition defeat, such as a shorted spark plug wire. In illustration (a) vectors 450 again represent the TDC position of the cylinder power strokes with cylinder 5 having a smaller amplitude as illustrative of that cylinder's loss of power. The loss of one cylinder results in a lower sub-cyclic frequency component approximately $\frac{1}{4}$ in the engine/load system, and the lower natural frequency of the dyne causes amplification of the low frequency component, as illustrated by the resultant load delta speed waveform 500 in illustration (b). Resonance of the dyne causes amplification of the low-frequency speed component and a low-frequency modulation of the engine delta speed waveform 502 of illustration (c). The sub-cyclic fluctuation of engine delta speed associated with cylinder 5 is illustrated by the speed delta pulse 504. Although the contribution of cylinder 5 to the delta speed waveform appears small, the distortion caused by the low-frequency modulation prevents accurate discrimination between the bad cylinder contribution and the sub-cyclic fluctuations associated with the remaining good cylinders of the engine which are also distorted. Although (even with the excessive distortion of the engine delta speed waveform) the engine failure could be easily detected it would be impossible to isolate the source of the failure to the bad cylinder. In the net engine delta torque values for the cam cycle data, as illustrated by the waveform 506 in illustration (d), the low-frequency component is factored out resulting in a substantially clean torque waveform from which the faulted cylinder's contribution, as shown by the sub-cyclic torque pulse 508 corresponding to the cylinder 5 position, may be readily detected.

Figure 10:
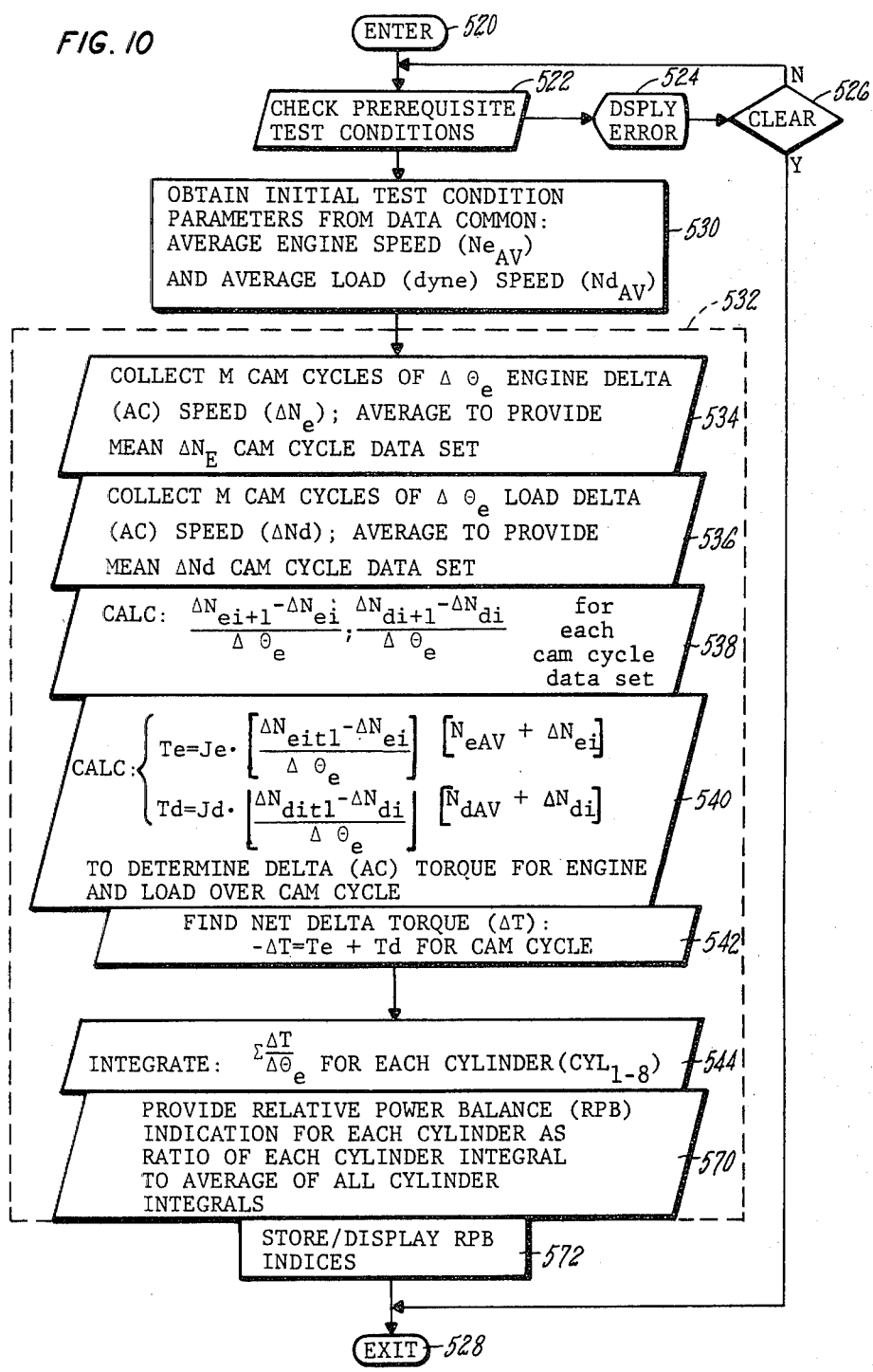
FIG. 10 is a simplified logic flowchart diagram illustrating the relative power contribution of the present invention as performed in the control system of FIG. 2.

Referring now to FIG. 10, in a simplified flowchart illustration of the relative power contribution test of the present invention, as used in the control system of FIG. 2, the CPU enters the flowchart at interrupt 520 and executes subroutine 522 to determine if the prerequisite engine test conditions have been established. The prerequisite conditions verify the load torque setting and ensure that the engine has achieved thermostat control and selected average engine test speed. The engine test speed and load torque value (Ft-Lb) are selected to maximize the work required of each cylinder, thereby creating higher peak-to-peak fluctuations in the sub-cyclic speed and enhancing the sub-cyclic net delta torque values obtained for analysis. In general this maximizing of cylinder work occurs at lower engine speeds in combination with higher load torque values. Of course, the values selected are engine dependent. Typical values for the assumed eight-cylinder engine are an engine speed of 1200 RPM and load torque of 75 Ft-Lb. Prior to beginning the test the selected test speed and load torque values are read out of the test plan in memory and provided through the analog interconnect to the throttle and dyne controls (55, 42, FIG. 1) to establish the setpoint control limits for each. Thermostat control is established by sensing the water and oil temperatures from the miscellaneous sensors (115, FIG. 1.) Failure to achieve prerequisite conditions results in instructions 524 displaying an error on the CRT (144, FIG. 2) and decision 526 determines whether or not an operator entered CLEAR has been made. If YES the CPU exits at 528, and if NO then branches back to instructions 522. Following establishment of the prerequisite test conditions, instructions 530 request initial test condition parameters from data common, which include average engine speed ($Ne_{AV}$) and average dyne speed ($Nd_{AV}$).

Following instructions 530, the CPU performs the relative power contribution test routine 532. This begins with subroutine 534 which requests one or more (M) cam cycles of engine delta speed ($\Delta Ne$) values measured at selected, equal crankshaft angle intervals. The interrupt mode established by the interface 152 causes the CPU to read the instantaneous engine speed values at the analog bus interface for each selected crankshaft angle interrupt. The crankshaft angle interrupts having equal angle intervals provided at any desired angle increment down to the minimum crankshaft angle resolution available, i.e. 0.7° for the selected dyne tooth sensor and signal conditioning described. The actual count values associated with each crankshaft angle value within the cam axle are established from the crankshaft synchronization subroutine of FIG. 7. For an M number of cam cycles of data, the cam cycle data sets are averaged to eliminate cycle-to-cycle variations and to provide a mean cam cycle data set. Subroutine 536 similarly collects and averages M cam cycles of load delta speed ($\Delta Nd$) data to provide a mean cam cycle data set along the same cam cycle angle increments used in the engine speed data acquisition.

Subroutines 538, 540 determine the net delta torque associated with the engine and load. Subroutine 538 requests the successive point differentiation of the mean delta speed data points for each as a function of crankshaft angle increment. Subroutine 540 first provides for conversion of the differentiated data into a real time indication of angular acceleration by multiplying each differentiated value by the instantaneous speed value obtained at the same crankshaft angle, as described in the derivation shown in Appendix A. The resultant indications of real time angular acceleration for each crankshaft angle increment is multiplied by the value of the rotational inertia value indications for the engine flywheel (Je) and dyne flywheel (Jd) (obtained from memory) to provide the delta torque values for the engine (Te) and dyne (Td) at each crankshaft angle increment along the cam cycle. Subroutine 542 next requests the net delta torque ($\Delta T$) values as the equal crankshaft angle, point by point summation of the two delta torque values provided in subroutine 540. The composite of the net delta torque data points are illustrated for a normal engine in FIG. 8, illustration (f) and for a faulted engine in FIG. 9 illustration (d).

Following acquisition of the net delta torque values for one cam cycle in subroutine 542, subroutine 544 next requests the integration of the sub-cyclic fluctuation in net delta torque associated with each cylinder. The actual integration is an approximation of a line integral taken along each cylinder associated fluctuation in the net delta torque data set. The integration limits may vary anywhere between the adjacent valleys marking each cylinder contribution to the net torque fluctuation, as illustrated in FIG. 9 illustration (d) by the cross-hatch area 546 of the net delta torque pulse 548 associated with cylinder 2. The pulse width is defined by the crankshaft angle values associated with the valleys 550, 552 of the waveform. If desired the entire pulse may be integrated, from valley to valley, which results in the determination of the total area under the net torque pulse. The same integration limits may be imposed for each of the other cylinder related torque pulses with the resultant integral value for each cylinder being compared with each other cylinder to determine the relative power balance.

For the faulted engine condition of FIG. 9 the full area integration limits may be used to easily detect the failed number 5 cylinder. The full area integration limits may not, however, be suitable for use with a relative power balance test intended to detect more minor engine malfunctions i.e. minor imbalances in the power contribution of each cylinder indicative of a potential future fault. This is evident from illustration (f) of FIG. 8 where the net delta torque waveform 490 represents that obtained from an assumed normal engine. Greater discrimination in detecting the relative power balance may be obtained from knowledge of the given test engine model characteristics, such that integration limits may be established to provide integration along that portion, less than the whole cylinder contribution envelope, which are known to provide a higher degree of fault manifestation for the particular engine. As such, the particular line integration limits may result in integral slices taken along a portion of each cylinder's contribution to the net delta torque, as illustrated by the integral slice 560 for the net torque pulse 562 of the waveform 490 (FIG. 8, illustration (f). The integral limits for the slice 560 may be selected to coincide with that sensitive portion of the net delta torque envelope as determined by the particular engine model characteristics. Whereas the full area integration limits illustrated in FIG. 9 are generally applicable to any engine cylinder configuration since with full area integration of each cylinder torque pulse the effects of valve overlap are in effect cancelled out, the integral slice limits must be selected such that the valve overlap problem is taken into consideration.

The net delta torque integrations of subroutine 544 are performed by the CPU with known graphical integration methods. This may include rectangular or trapezoidal methods of integration. The limits, whether full area or one or more integral slices, are provided either in the test plan routine if the relative power contribution is to be performed on consecutive ones of the same type of engine, or may be entered by operator entry through the keyboard (144, FIG. 2). Whatever the limits selected, the essential criteria is that each cylinder contribution is integrated over the same integral limits with respect to the cylinder's TDC to allow the relative power balance comparison.

Following subroutine 544, subroutine 570 requests the determination of the relative power balance indication for each cylinder. Typically, this is provided as the ratio of each cylinder integral value to the average integral value measured for all cylinders. The relative power balance indices for each cylinder are then stored, or displayed, or both, in instructions 572, after which the CPU exits the program at 528. The typical format for displaying the relative power contribution, or power balance indications, is illustrated in Table 1 for an engine having P number of cylinders.

TABLE I

| CYL # | 1 | 2 ...... | P |
|---|---|---|---|
| INT VAL | $K_1$ | $K_2$ ...... | $K_p$ |

TABLE I-continued

| RPC | $\dfrac{K_1}{K_a}$ | $\dfrac{K_2}{K_a}$ ...... | $\dfrac{K_p}{K_a}$ |
|---|---|---|---|

Each integral summation of the particular cylinder's contribution to the fluctuation in sub-cyclic net torque is listed as integral summations $K_1$ through $K_p$, and the relative power contribution of each cylinder is listed as the ratio of each individual cylinder integral sum divided by the average integral value ($K_a$) for the P cylinder integrals. Typically, the power contribution value obtained for each cylinder may be read as a percentage value with the tolerance established for the acceptable performance being defined as a percentage of power and balance.

Since measurement of power contribution is on a relative basis the comparisons of each cylinder's contribution need not be based on absolute values. The net delta torque value, although it may be obtained as an absolute value using actual engine and load rotational inertia values, may similarly be provided as a ratio of net delta torque divided by the engine rotational inertia. This ratio is equal to the time differentiated indication of engine delta speed plus the time differentiated indication of load delta speed multiplied by a ratiometric factor equal to the ratio of the load inertia divided by the engine inertia. The effect is that although the quantity is not pure net delta torque, the proportionate magnitudes of the engine delta torque and load delta torque values are properly scaled to reflect the contribution of each to the net delta torque value. In other words, although a rigorous, and perhaps preferred indication would be the absolute net delta torque, an indication of net delta torque which reflects the contribution of the engine and load may also be used.

The relative power contribution of the present invention provides a quantitative measurement standard by which engine performance may be measured, and with which a non-subjective, quality pass/fail criteria may be established for testing engines under hot-test. The relative power contribution is performed with the engine under load and running at essentially constant speed, thereby eliminating the limitations of the snap acceleration power contribution method used in vehicle mounted engines. The effects of the engine load which result in data distortion are eliminated by use of the net delta torque value. The sub-cyclic fluctuations produced by each cylinder are accurately measured by exact identification of each cylinder contribution along the cam cycle, provided through synchronization of the power contribution data acquisition to the engine crankshaft.

The present invention may be used in determining relative power balance of any type of IC engines. The engine load may be any type suitable for providing a selectable torque load on the engine crankshaft. Similarly, although the invention has been shown and described with respect to a best mode embodiment thereof, it should be understood by those skilled in the art that the foregoing and various other changes, omissions and additions in the form and detail thereof may be made therein without departing from the spirit and scope of this invention.

APPENDIX A

Power Contribution Analysis

Let:
Te = Engine Output Torque.
Td = Applied Average Load Torque.
$\theta e$ = Shaft Position of Engine Crank Shaft
$\theta d$ = Shaft Position of the Load.
Je = Rotary Inertia of the Engine Flywheel and a Portion of the Coupling Mechanism.
Jd = Rotary Inertia of the Load, the Starter Flywheel, and a Portion of the Coupling.
K = The Spring Modulus of the Clutch Coupling.
Assuming friction is negligible, then:

$$Te + Je \frac{d^2\theta e}{dt^2} + K(\theta d - \theta e) = 0 \quad (1)$$

and $$Td + Jd \frac{d^2\theta d}{dt^2} - K(\theta d - \theta e) = 0 \quad (2)$$

Summing equations (1) and (2):

$$Te + Td = -Je \frac{d^2\theta e}{dt^2} - Jd \frac{d^2\theta e}{dt^2} \quad (3)$$

Assuming a steady-state loaded condition:

$$Te = T(\text{nominal}) + \Delta T \quad (4)$$

$$Td = -T(\text{nominal}) \quad (5)$$

therefore, $$-\Delta T = Je \frac{d^2\theta e}{dt^2} + Jd \frac{d^2\theta d}{dt^2} \quad (6)$$

This represents the fundamental dynamic equation used in the test. Since the inertias for a given system are constants, delta torque output can be calculated by sensing the speeds of the masses and computing a time derivative as described below.

Engine speed (Ne = $d\theta e/dt$) is input to the computer as two signals, Ne(avg) and $\Delta$Ne where Ne(avg) represents the steady state speed and $\Delta$Ne is a function of engine shaft angle ($\theta e$). Using the basic derivative relationship, $$\frac{d}{dx}[f(u)] = \frac{d}{du}[f(u)] \cdot \frac{du}{dx} \quad (7)$$

then:

$$\frac{d^2\theta e}{dt^2} = \frac{d}{dt} \cdot \frac{d\theta e}{dt} = [Ne(\text{avg}) + \Delta Ne(\theta e)] \cdot \frac{d\theta e}{dt}, \quad (8)$$

or:

$$\frac{d^2\theta e}{dt^2} = \frac{d}{d\theta e}[\Delta Ne(\theta e)] \cdot [\Delta Ne(\text{avg}) + \Delta Ne(\theta e)] \quad (9)$$

In a similar manner, the load acceleration is:

$$\frac{d^2\theta d}{dt^2} = \frac{d}{d\theta d}[\Delta Nd(\theta e)] \cdot [Nd(\text{avg}) + \Delta Nd(\theta e)] \quad (10)$$

We claim:

1. Apparatus for measuring the relative power contribution between cylinders of an internal combustion (IC) engine connected through its crankshaft to the drive shaft of an engine load and running at a selected speed, comprising:

engine speed sensing means, responsive to rotation of the engine crankshaft, for providing an actual engine speed signal indicative of average engine speed and subcyclic engine speed;

load speed sensing means, responsive to rotation of the load drive shaft, for providing an actual load speed signal indicative of average load speed and sub-cyclic load speed; and signal processing means, responsive to said actual engine speed signal and said actual load speed signal, and having memory means for storing signals indicative of the rotational inertia of the engine and load, for providing, in response to said engine and said load speed signals, signals indicative of the sub-cyclic angular acceleration of the engine and load over at least one full engine cycle, for providing, in response to said engine and said load acceleration signals, signals indicative of the sub-cyclic torque of the engine and the load as the product of the corresponding one of said acceleration signals multiplied by the associated one of said stored signals indicative of the rotational inertia of the engine and the load, for providing from said engine and load sub-cyclic torque signals a net sub-cyclic torque signal at a magnitude equal to the difference torque value therebetween, and for identifying each sub-cyclic fluctuation in said net torque signal, and for comparing the magnitude of each of said sub-cyclic fluctuations to the magnitudes of all other of said fluctuations occurring in a common engine cycle to provide signal indications of the relative power contribution between cylinders.

2. The apparatus of claim 1, further comprising:

position sensing means, adapted to be disposed along the drive shaft for providing crankshaft position signals indicative of the angular position of the engine crankshaft at crankshaft angle intervals less than that associated with a cylinder sub-cycle;

crankshaft index sensor means, disposed on the engine, for providing in each engine cycle a crankshaft synchronization signal indicative of the occurrence of a selected engine cycle event; and wherein said signal processing means is responsive to said crankshaft position signal and said crankshaft synchronization signal, for providing signals indicative of each cylinder power stroke in each engine cycle, for sensing said actual engine speed signal and said actual load speed signal in response to each crankshaft angle interval manifestation provided by said position signal, to provide said net torque signal value for each crankshaft angle interval, and for identifying said cylinder power stroke signals as being associated with said net torque values in each crankshaft angle interval to provide identification of each sub-cyclic fluctuation in said net torque with an associated one of said cylinders, whereby said signal indications of relative power contribution is provided for each identified cylinder.

3. The apparatus of claim 1, wherein said processing means provides said signal indications of relative power contribution as the ratio of the magnitude of each of said sub-cyclic fluctuations in said net torque signal to the average magnitude of all of said fluctuations in a common engine cycle.

4. The method of measuring the relative power contribution between cylinders of an internal combustion engine connected through its crankshaft to the drive shaft of an engine load and running at a selected speed, comprising:

sensing the instantaneous angular position of the drive shaft to provide crankshaft position signals manifesting the instantaneous position of the engine crankshaft at successive angle intervals within the engine cycle, each angle interval being less than that associated with a cylinder sub-cycle;

measuring the actual speed of the engine crankshaft and the load drive shaft at each crankshaft position signal value to provide an indication of the sub-cyclic fluctuations in angular acceleration of each as they occur over one engine cycle;

providing engine torque and load torque signals over at least one engine cycle by multiplying the respective values of angular acceleration by the rotational inertia of the engine and load;

calculating a net torque value for each crankshaft position signal value as the difference values between said engine and load torque signals, to provide an indication of the sub-cyclic fluctuations in net torque over one engine cycle, and comparing the magnitudes of said sub-cyclic fluctuations in a common engine cycle to provide signal indications of the relative power contribution between cylinders.

5. The method of claim 4, further comprising the steps of:

sensing a crankshaft index to provide a crankshaft synchronization signal definitive of the occurrence in each engine cycle of a known engine cycle event, determining from said crankshaft synchronization signal and said crankshaft position signals the crankshaft angle intervals associated with each cylinder, and identifying said sub-cyclic fluctuations in net torque as being associated with particular cylinder crankshaft angle intervals to provide identification of each of said fluctuations with an associated one of the cylinders, whereby said indications of relative power contributions are provided for each identified cylinder.

* * * * *

UNITED STATES PATENT AND TRADEMARK OFFICE
CERTIFICATE OF CORRECTION

PATENT NO. : 4,301,678
DATED : November 24, 1981
INVENTOR(S) : Gary G. Full, Rinaldo R. Tedeschi It is certified that error appears in the above—identified patent and that said Letters Patent is hereby corrected as shown below:

Column 1, line 13 "engins" should be --engines--.

Column 1, line 47 "electronoic" should be --electronic--.

Column 3, line 28 "association" should be --associated--.

Column 5, line 48 "constitutes" should be --constituents--.

Column 7, line 7 "RXS11-" should be --RSX11- --.

Column 7, line 25 "involves" should be --includes--.

Column 17, line 20 "on" should be --or--.

Column 19, line 15 "approximately ¼" should be --(approximately ¼)--

Signed and Sealed this

Fourth Day of January 1983

[SEAL]

Attest:

Attesting Officer

GERALD J. MOSSINGHOFF

Commissioner of Patents and Trademarks